United States Patent
Jerance et al.

(10) Patent No.: US 11,555,714 B2
(45) Date of Patent: Jan. 17, 2023

(54) METHOD AND SENSOR SYSTEM FOR DETERMINING A RELATIVE ANGULAR POSITION BETWEEN TWO PARTS, AND METHOD FOR MANUFACTURING A MAGNETIC BODY

(71) Applicant: ELECTRICFIL AUTOMOTIVE, Beynost (FR)

(72) Inventors: Nikola Jerance, Lyons (FR); Harijaona Lalao Rakotoarison, Beynost (FR)

(73) Assignee: ELECTRICFIL AUTOMOTIVE, Beynost (FR)

( * ) Notice: Subject to any disclaimer, the term of this patent is extended or adjusted under 35 U.S.C. 154(b) by 9 days.

(21) Appl. No.: 17/283,118

(22) PCT Filed: Oct. 10, 2019

(86) PCT No.: PCT/FR2019/052397
§ 371 (c)(1),
(2) Date: Apr. 6, 2021

(87) PCT Pub. No.: WO2020/079350
PCT Pub. Date: Apr. 23, 2020

(65) Prior Publication Data
US 2021/0381851 A1    Dec. 9, 2021

(30) Foreign Application Priority Data
Oct. 15, 2018 (FR) ........................... 1859543

(51) Int. Cl.
*G01D 5/14* (2006.01)
*H01F 7/02* (2006.01)

(52) U.S. Cl.
CPC ............. *G01D 5/14* (2013.01); *H01F 7/0294* (2013.01)

(58) Field of Classification Search
CPC ......................................................... G01D 5/14
See application file for complete search history.

(56) References Cited

U.S. PATENT DOCUMENTS

| 6,433,537 B1 | 8/2002 | Petersen |
| 6,518,749 B1 * | 2/2003 | Oudet ....................... G01B 7/30 |
| | | 324/207.2 |

(Continued)

FOREIGN PATENT DOCUMENTS

| DE | 20 210 548 U1 | 8/2003 |
| DE | 20 2007 006 955 U1 | 8/2007 |

(Continued)

OTHER PUBLICATIONS

International Search Report, dated Mar. 4, 2020, corresponding to PCT/FR2019052397.

(Continued)

Primary Examiner — Walter L Lindsay, Jr.
Assistant Examiner — Milton Gonzalez
(74) Attorney, Agent, or Firm — Ladas & Parry LLP; Malcolm J. MacDonald

(57) ABSTRACT

A method for determining a relative angular position between two parts about an axis of rotation (A), implementing a magnetized body (10), in the shape of an angular curved sector about the axis of rotation (A), characterized in that the magnetization plane of the magnetized body (PM) is parallel to the axis of rotation (A), for a sensor system having such a magnetized body, and to a method for manufacturing such a magnetized body.

31 Claims, 10 Drawing Sheets

(56) References Cited

U.S. PATENT DOCUMENTS

| | | |
|---|---|---|
| 6,545,463 B1 | 4/2003 | Dettmann et al. |
| 6,720,763 B1 | 4/2004 | Nehl et al. |
| 6,762,897 B1 | 7/2004 | Kabashima et al. |
| 2002/0021124 A1 | 2/2002 | Schott et al. |
| 2004/0004473 A1 | 1/2004 | Gassman et al. |
| 2004/0232913 A1 | 11/2004 | Schott et al. |
| 2005/0253578 A1 | 11/2005 | Kawashima et al. |
| 2006/0028203 A1 | 2/2006 | Kawashima et al. |
| 2007/0090827 A1 | 4/2007 | Jarrard |
| 2007/0139042 A1 | 6/2007 | Legrand |
| 2008/0089327 A1 | 4/2008 | Lu et al. |
| 2008/0100284 A1 | 5/2008 | Dobler et al. |
| 2008/0265877 A1 | 10/2008 | Kato et al. |
| 2009/0033315 A1 | 2/2009 | Kawashima et al. |
| 2009/0033321 A1 | 2/2009 | Kurihara |
| 2009/0224750 A1 | 9/2009 | Hosek et al. |
| 2009/0309580 A1 | 12/2009 | Dmytriw et al. |
| 2010/0045275 A1 | 2/2010 | Frachon |
| 2010/0213927 A1 | 8/2010 | Mehnert et al. |
| 2010/0231205 A1 | 9/2010 | Jerance et al. |
| 2011/0037459 A1 | 2/2011 | Okada et al. |
| 2011/0043197 A1 | 2/2011 | Trontelj |
| 2011/0115479 A1 | 5/2011 | Blakesley |
| 2011/0175600 A1 | 7/2011 | Jerance et al. |
| 2011/0185579 A1 | 8/2011 | Pellene |
| 2011/0254543 A1 | 10/2011 | Frachon et al. |
| 2011/0304324 A1 | 12/2011 | Acker |
| 2012/0146627 A1 | 6/2012 | Masson et al. |
| 2012/0161755 A1 | 6/2012 | Masson et al. |
| 2012/0223699 A1 | 9/2012 | Holman, Jr. et al. |
| 2012/0262157 A1 | 10/2012 | Liebart |
| 2012/0262162 A1 | 10/2012 | Masson et al. |
| 2012/0313631 A1 | 12/2012 | Sterling |
| 2013/0027027 A1 | 1/2013 | Heriban et al. |
| 2013/0113469 A1 | 5/2013 | Wallrafen |
| 2013/0169270 A1 | 7/2013 | Delbaere et al. |
| 2013/0179117 A1 | 7/2013 | Delbaere et al. |
| 2015/0022192 A1 | 1/2015 | Ausserlechner |
| 2015/0061654 A1 | 3/2015 | Onodera et al. |
| 2015/0142376 A1 | 5/2015 | Ausserlechner |
| 2015/0152049 A1 | 6/2015 | Maltese et al. |
| 2015/0177023 A1 | 6/2015 | Klocke |
| 2015/0226581 A1 | 8/2015 | Schott et al. |
| 2016/0061630 A1 | 3/2016 | Ausserlechner et al. |
| 2016/0258781 A1 | 9/2016 | Ausserlechner et al. |
| 2017/0074680 A1 | 3/2017 | Reymond |
| 2017/0254671 A1 | 9/2017 | Aichriedler et al. |
| 2020/0393270 A1 | 12/2020 | Delbaere et al. |
| 2021/0088359 A1 | 3/2021 | Jerance |

FOREIGN PATENT DOCUMENTS

| | | |
|---|---|---|
| DE | 10 2006 051720 A1 | 9/2007 |
| DE | 10 2012 111 653 A1 | 6/2014 |
| DE | 10 2017 221 753 A1 | 6/2019 |
| EP | 0 511 459 A2 | 11/1992 |
| EP | 0 800 055 A1 | 10/1997 |
| EP | 1 074 818 A1 | 2/2001 |
| EP | 1 083 406 A2 | 3/2001 |
| EP | 1 882 871 A1 | 1/2008 |
| FR | 3 079 927 A1 | 10/2019 |
| JP | 2009-192261 A | 8/2009 |
| WO | 2014090343 A1 | 6/2014 |

OTHER PUBLICATIONS

MLX90365 Triaxis Position Sensor IC Datasheet, Melexis, pp. 1-46, 2016.

Delbaere, M., Frachon, D., Masson, G., 2014, SAE International, "Magnetic Resolver: A Design-To-Cost Mternative to Conventional Variable Reluctance resolvers for the Electric Drives Control", pp. 1-7.

AS5403A/D/E, "3D Hall Position Sensor for Linear and Off-Axis Applications", ams Datasheet, 2017, pp. 1-66.

Dorge, T., et al., "High precision and simple analog through-shaft magnetic sensors for the control of electric drives", Sensor+Test conferences 2011, pp. 787-791.

MLX90333 Triaxis 3D-Joystick Position Sensor, Datasheet, Melexis, Jan. 2008, pp. 1-43.

MLX90333 Triaxis 3D-joystick Position Sensor, Winkel und Achsen (SOIC8), as electronic GmbH & Co. KG, Rev. 1.12, 2008, pp. 1-2.

MLX90372—Triaxis® Position Processor Datasheet, Melexis, Revision 8, Mar. 8, 2019, pp. 1-85.

* cited by examiner

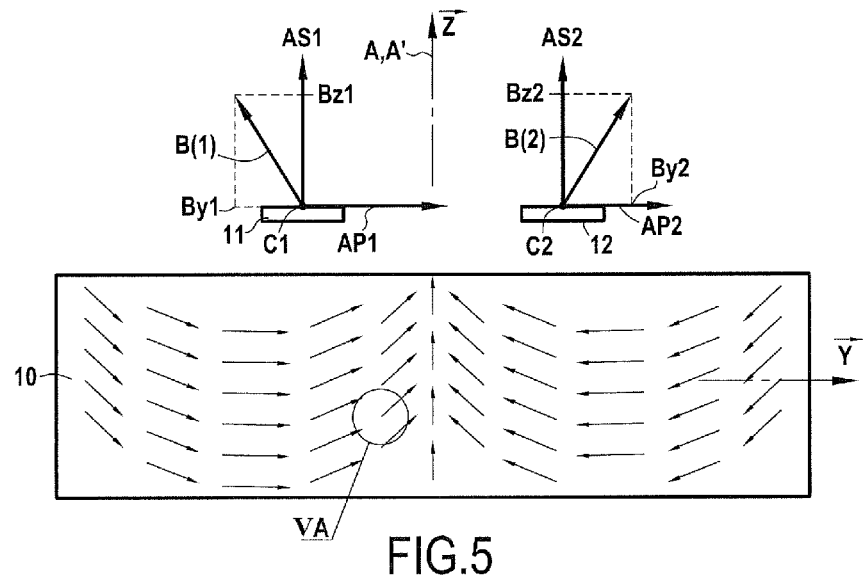
FIG.5
FIG.5A
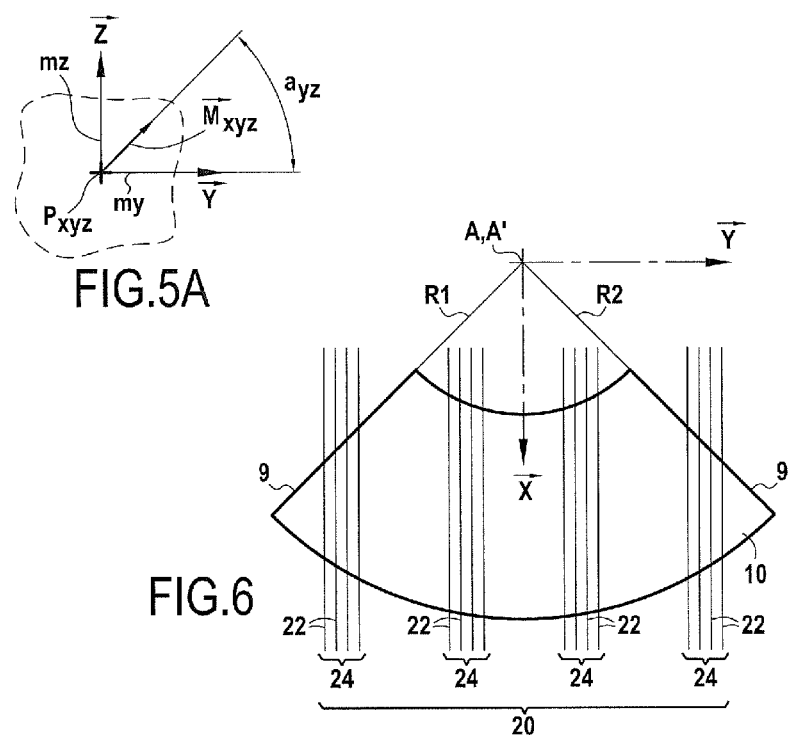
FIG.6

METHOD AND SENSOR SYSTEM FOR DETERMINING A RELATIVE ANGULAR POSITION BETWEEN TWO PARTS, AND METHOD FOR MANUFACTURING A MAGNETIC BODY

The invention relates to a method for determining a relative angular position of a first part with respect to a second part about an axis of rotation, which will be advantageously implemented using a magnetic position sensor. The invention also relates to a method for making a magnetic body for such a method and for such a sensor system.

The technical advantages of the magnetic sensor systems are well known. They can be produced at relatively low costs, they are not subject to significant mechanical wear, and they are nearly insensitive to moisture and non-magnetic dirt (dust, oil, etc.). Thanks to these advantages, the magnetic sensor systems are often used in automotive applications.

A magnetic angular position sensor system includes at least one magnetized body with permanent magnetization, and at least one magnetic field measurement cell, the sensor system being provided to measure the relative position of the measurement cell with respect to the magnetized body, about the axis of rotation.

In a practical application, the mechanism to be monitored includes a first part and a second part which are movable in rotation with respect to each other. The magnetized body is made secured to the first part, or integrated therein, while the measurement cell(s) is/are made secured to the second part of the mechanism, and the sensor system allows determining the relative position of the two parts of the mechanism.

In some cases, it is desired to be able to measure the relative position over an angular stroke.

Typically, in an application in the automotive field, such sensor systems are used to determine the angular position of a control lever of an automatic gearbox. According to another application, such sensor systems can be used to determine the angular position of an output member of an actuator, for example for a parking brake actuator. The invention is intended to solve the problems related to the practical implementation of the sensor systems, which are often intended to be integrated in a constrained space, with a limited available volume, and often in the presence of ferromagnetic parts in the vicinity of the sensor system, which may reduce the accuracy of the determination of the angular position.

Document EP-2.212.652 discloses a method in which a sensor system is implemented by using a combination of the radial component with the tangential component of the magnetic field created by a magnetized body. In this method, a first part is equipped with a magnetized body, in the shape of a cylindrical ring of revolution about the axis of rotation, and with a magnetization at any point of the magnetized body, a magnetization whose magnetization vector:
is parallel to a fixed magnetization plane of the magnetized body, and
has a continuously variable direction in the magnetization plane as a function of the position of the point of the magnetized body along a direction perpendicular to the axis of rotation in the magnetization plane.

A second part is equipped with:
a first measurement cell at a first measurement point, delivering two electrical signals representative respectively of a primary component and a secondary component of the magnetic field created by the magnetized body at the measurement point of the considered cell, in a measurement plane,
a second measurement cell at a second measurement point, delivering two electrical signals representative respectively of a primary component and of a secondary component of the magnetic field created by the magnetized body at the measurement point of the considered cell, in the measurement plane.

The method determines a value representative of the relative angular position between the two parts by determining an angle whose tangent is a function of a differential composition of said components measured by the two cells for a given relative angular position.

The achievement of the magnetization necessary for the operation of this method, on a curved magnet about a main axis, however turns out to be complex to implement in an industrial context.

Document WO2007099238 describes a sensor using magnetization which has a variation along the stroke. However, in the case of a rotary sensor with rigid permanent magnet, this magnetization requires a magnetization head having a complex and geometry which is often difficult to achieve.

Other solutions with a variable magnetization direction are presented in documents DE102012111653, U.S. Pat. No. 6,545,463, EP0997706, for the production of linear sensors. The teaching of these documents is not directly transposable to angular position sensors because the proposed magnetizations are difficult to achieve and the magnetic field in the sensor could be too weak, especially with cheap permanent magnets, such as ferrites.

U.S. Pat. No. 8,022,694 presents a magnetization and the magnetization head to create this magnetization. However, this solution does not allow optimizing the magnetization angle obtained in the volume of the magnet and, in addition, the magnetization of a sufficiently powerful magnet, within the thickness necessary for this application, would require a very large current and therefore an expensive electronic device even impossible to make.

The Applicant's document EP2488830 proposes a magnetized body for an angular position sensor which has a variation in the magnetization angle as a function of the rotational position, but with a magnetization plane which is perpendicular to the axis of rotation.

The invention aims at defining a method for determining the relative angular position between two parts which allows the use of a sensor system that is simpler to make on an industrial scale.

For this purpose, the invention proposes a method for determining a relative angular position of a first part with respect to a second part over an angular stroke about an axis of rotation, in which:
the first part is equipped with a magnetized body, in the shape of an angular curved sector about the axis of rotation, said angular sector including a single angular portion or several successive angular portions about the axis of rotation, the magnetized body having, at any point of at least one angular portion of the magnetized body, a magnetization whose magnetization vector:
is parallel to a fixed magnetization plane for said angular portion of the magnetized body, and
has a continuously variable direction in the magnetization plane as a function of the position of the point of the magnetized body along a direction perpendicular to the axis of rotation in the magnetization plane;

the second part is equipped with at least a first measurement cell at a first measurement point, delivering two electrical signals representative respectively of a primary component and a secondary component of the magnetic field created by the magnetized body at the measurement point of the considered cell, in a measurement plane, the method determines a value representative of the relative angular position between the two parts as a function of said components measured by the measurement cell for a given relative angular position.

The method is characterized in that the magnetization plane of the magnetized body is parallel to the axis of rotation.

According to other characteristics of a method according to the invention, taken individually or in combination:

The magnetized body may include a single angular portion, the magnetized body then having, at any point of the magnetized body, a magnetization whose magnetization vector:
  is parallel to a single fixed magnetization plane for the magnetized body, and
  has a continuously variable direction in the magnetization plane as a function of the position of the point of the magnetized body along a direction perpendicular to the axis of rotation (A) in the magnetization plane.

The magnetization plane may be perpendicular to a radius derived from the axis of rotation. It may be in particular perpendicular to a radius derived from the axis of rotation and comprised in the angular extent of the magnetized body about the axis of rotation. It may be more particularly perpendicular to a radius derived from the axis of rotation and oriented along a bisector of the extent of the magnetized body or of the angular stroke.

The magnetized body may include at least a first angular portion and at least a second angular portion distinct from each other about the axis of rotation, the magnetized body then having a magnetization whose magnetization vector:
  at any point of the first angular portion of the magnetized body, is parallel to a first fixed magnetization plane,
  at any point of the second angular portion of the magnetized body, is parallel to a second fixed magnetization plane, and
  has a continuously variable direction in the considered magnetization plane as a function of the position of the point of the considered angular portion of the magnetized body along a direction perpendicular to the axis of rotation in the considered magnetization plane.

For each angular portion, the magnetization plane may be perpendicular to a radius derived from the axis of rotation and comprised in the angular extent of the considered angular portion.

The second part may be equipped with a second measurement cell at a second measurement point, delivering two electrical signals representative respectively of a primary component and a secondary component of the magnetic field created by the magnetized body at the measurement point of the considered cell, in the measurement plane, and the method can then determine a value representative of the relative angular position between the two parts by determining a raw angle whose tangent is a function of a differential composition of said components measured by the two cells for a given relative angular position.

The first and second measurement cells may be arranged on the second part such that the primary measurement axes of the first and second measurement cells are parallel to each other, and that the secondary measurement axes of the first and second measurement cells are parallel to each other;

The method can determine a value representative of the relative angular position between the two parts by determining a raw angle whose tangent is a function of a ratio between on the one hand the difference of the secondary components and on the other hand the difference of the primary components, measured by the two cells for a given relative angular position.

The first measurement point of the first measurement cell and the second measurement point of the second cell may be arranged at equal distance from the axis of rotation and in positions spaced by a non-zero fixed angle about the axis of rotation.

The first measurement point of the first measurement cell and the second measurement point of the second cell may be arranged in positions spaced by a non-zero fixed angle and strictly less than 90 degree angle about the axis of rotation, preferably less than 30 degree angle, more preferably less than or equal to 20 degree angle about the axis of rotation.

The first and second measurement cells may be arranged on the second part such that the primary measurement axes of the first and second measurement cells, or the secondary measurement axes of the first and second measurement cells measurement, are oriented along the direction of a bisector of the angular deviation between the two measurement points, measured about the axis of rotation in a plane perpendicular to the axis of rotation.

The first measurement point of the first measurement cell and, where appropriate, the second measurement point of the second cell may be arranged at a distance from the axis of rotation which is smaller than the radius of an outer cylindrical surface of the magnetized body, while being offset from the magnetized body along the direction of the axis of rotation.

The magnetized body may have the shape of a segment of a tubular sector which is cylindrical of revolution about the main axis.

The magnetized body may have the shape of a segment of an angular sector of a disc which is cylindrical of revolution about the main axis of rotation.

The magnetized body may have the shape of an angular sector at a 180 degree angle or less about the axis of rotation.

The measurement plane of the measurement cell(s) may be parallel to the axis of rotation.

The invention further relates to a sensor system for determining a relative angular position of a first part with respect to a second part over an angular stroke about an axis of rotation, the system comprising:
  a magnetized body in the shape of an angular curved sector about a main axis parallel to the axis of rotation, said angular sector including a single angular portion or several successive angular portions about the main axis, and the magnetized body having a magnetization with, at any point of at least one angular portion of the magnetized body, a magnetization whose magnetization vector:

is parallel to a fixed magnetization plane for said angular portion of the magnetized body, and has a continuously variable direction in the magnetization plane as a function of the position of the point of the magnetized body along a direction perpendicular to the axis of rotation in the magnetization plane;

a first measurement cell at a first measurement point, delivering two electrical signals representative respectively of a primary component and a secondary component of the magnetic field created by the magnetized body at the measurement point of the considered cell, in a measurement plane, a second measurement cell at a second measurement point, delivering two electrical signals representative respectively of a primary component and a secondary component of the magnetic field created by the magnetized body at the measurement point of the considered cell, in the measurement plane.

The sensor system is characterized in that the magnetization plane of the magnetized body is parallel to the axis of rotation.

According to other characteristics of a system according to the invention, taken individually or in combination:

The magnetized body may include a single angular portion, the magnetized body having, at any point of the magnetized body, a magnetization whose magnetization vector:

is parallel to a single fixed magnetization plane for the magnetized body, and has a continuously variable direction in the magnetization plane as a function of the position of the point of the magnetized body along a direction perpendicular to the main axis in the magnetization plane.

The magnetization plane may be perpendicular to a radius derived from the main axis. It may be in particular perpendicular to a radius derived from the axis of rotation and comprised in the angular extent of the magnetized body about the axis of rotation. It may be more particularly perpendicular to a radius derived from the axis of rotation and oriented along a bisector of the angular extent of the magnetized body or of the angular stroke.

The magnetized body may include at least a first angular portion and at least a second angular portion distinct from each other about the main axis, the magnetized body then having a magnetization whose magnetization vector;

is parallel to a first fixed magnetization plane, at any point of the first angular portion of the magnetized body, is parallel to a second fixed magnetization plane, at any point of the second angular portion of the magnetized body, and has a continuously variable direction in the considered magnetization plane as a function of the position of the point of the considered angular portion of the magnetized body along a direction perpendicular to the main axis (A') in the considered magnetization plane.

For each angular portion, the magnetization plane may be perpendicular to a radius derived from the main axis and comprised in the angular extent of the considered angular portion The system may include a second measurement cell at a second measurement point, delivering two electrical signals representative respectively of a primary component and a secondary component of the magnetic field created by the magnetized body at the measurement point of the considered cell, in the measurement plane, and the sensor system can determine a value representative of the relative angular position between the two parts by determining a raw angle whose tangent is a function of a differential composition of said components measured by the two cells for a given relative angular position.

The first and second measurement cells may be arranged such that the primary measurement axes of the first and second measurement cells are parallel to each other, and that the secondary measurement axes of the first and second measurement cells are parallel to each other.

The system may include a calculation unit programmed to determine a value representative of the relative angular position between the two parts by determining a raw angle whose tangent is a function of a ratio between on the one hand the difference of the secondary components and on the other hand the difference of the primary components, measured by the two cells for a given relative angular position.

The first measurement point of the first measurement cell and the second measurement point of the second cell may be arranged at equal distance from the axis of rotation and in positions spaced by a non-zero fixed angle.

The first measurement point of the first measurement cell and the second measurement point of the second cell may be arranged in positions spaced by a non-zero fixed angle and strictly less than 90 degree angle about the axis of rotation, preferably less than 30 degree angle, more preferably less than or equal to 20 degree angle about the axis of rotation.

The first measurement point of the first measurement cell and, where appropriate, the second measurement point of the second cell may be arranged at a distance from the axis of rotation which is smaller than the radius of an outer cylindrical envelope surface of the magnetized body, while being offset from the magnetized body along the direction of the axis of rotation (A).

The first and second measurement cells may be arranged such that the primary measurement axes of the first and second measurement cells, or the secondary measurement axes of the first and second measurement cells, are oriented along the direction of a bisector of the angular deviation between the two measurement points, measured about the axis of rotation in a plane perpendicular to the axis of rotation.

The magnetized body may have the shape of a segment of a tubular sector which is cylindrical of revolution about the axis of rotation, or of a segment of an angular sector of a disc which is cylindrical of revolution about the axis of rotation.

The magnetized body may have the shape of an angular sector whose angular extent is greater than 60 degree angle, preferably greater than 80 degree angle, or even equal to 360 degree angle, about the axis of rotation.

The magnetized body may have the shape of an angular sector which is cylindrical of revolution about the main axis.

The main axis may coincide with the axis of rotation.

The measurement plane of the measurement cell(s) may be parallel to the axis of rotation.

The invention also relates to a method for manufacturing a magnetized body for a system for determining a relative angular position of a first part with respect to a second part about an axis of rotation, the method comprising providing a body of magnetizable material having the shape of an angular curved sector and having an angular extent about a main axis, and said angular sector including a single angular portion or several successive angular portions about the main axis.

The method is characterized in that it includes, for at least a first angular portion of the magnetized body:

the disposition, in the vicinity of the first angular portion of the body of magnetizable material, of a first network of parallel electrical conductors comprising several bundles of parallel electrical conductors, having an orientation perpendicular to the main axis and parallel to a first directrix radius derived from of the main axis and comprised in the angular extent of the first considered angular portion of the magnetized body, the bundles being offset laterally from each other along an offset direction perpendicular to their orientation and perpendicular to the main axis;

the flow of an electric current in the bundles of electrical conductors, the direction of flow of the current, defined in a fixed reference frame with respect to the magnetized body, being identical in all the conductors of the same bundle, and being reversed in two adjacent bundles, thus forming one or several outgoing bundle(s) in which the current flows along a first direction, and one or several incoming bundle(s) in which the current flows along a second direction, opposite to the first direction, the current flowing in the bundles being able to generate, around the network and in the body of magnetizable material, a magnetization magnetic field suitable for magnetizing the body of magnetizable material.

According to other characteristics of a method according to the invention, taken individually or in combination:

The first network of parallel electrical conductors may extend facing the first portion of the body of magnetizable material which is a single portion covering the angular extent of the body of magnetizable material.

The first directrix radius may be oriented along a bisector of the angular extent of the body of magnetizable material.

The first network of parallel electrical conductors may extend facing a first portion of the body of magnetizable material, and a second network of parallel electrical conductors may extend facing a second portion of the body of magnetizable material, distinct from the first portion, the bundles of parallel electrical conductors of the second network being oriented along a second orientation perpendicular to the main axis and parallel to a second directrix radius derived from the main axis and comprised in the angular extent of the second considered angular portion.

The electrical conductors of the bundles may be formed by segments of at least one winding of a conductive wire along which at least a conductor of an outgoing bundle, a connecting segment, and a conductor of an incoming bundle, another connecting segment and another conductor of an outgoing bundle, follow each other repeatedly.

Various other characteristics emerge from the description given below with reference to the appended drawings which show, by way of non-limiting examples, embodiments of the object of the invention:

FIG. 5 is a schematic front view similar to that of FIG. 3, along the direction of a radius perpendicular to the axis of rotation, of the system of FIG. 1B, showing more particularly the magnetization of the magnetized body;

FIG. 5A is an enlargement of a portion of FIG. 5;

FIG. 6 is a schematic top view similar to that of FIG. 2A, along the direction of the axis of rotation, illustrating a magnetization method for making a magnetized body of a sensor system for implementing the invention;

Figure 14:
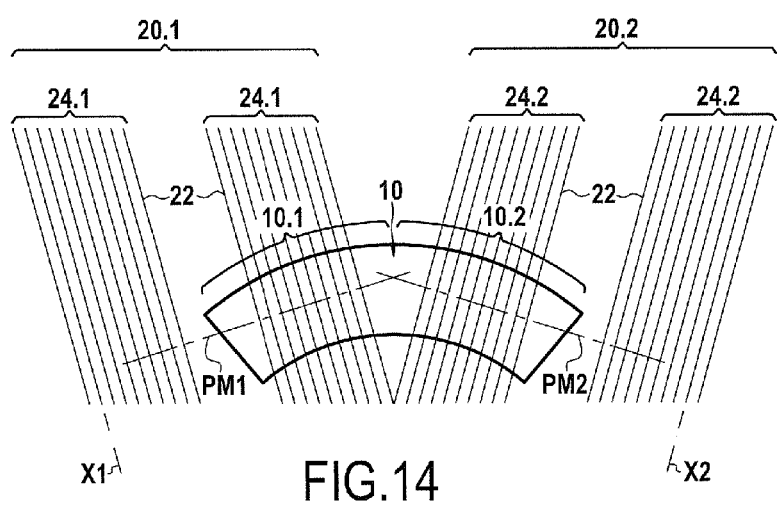
Figure 13A:
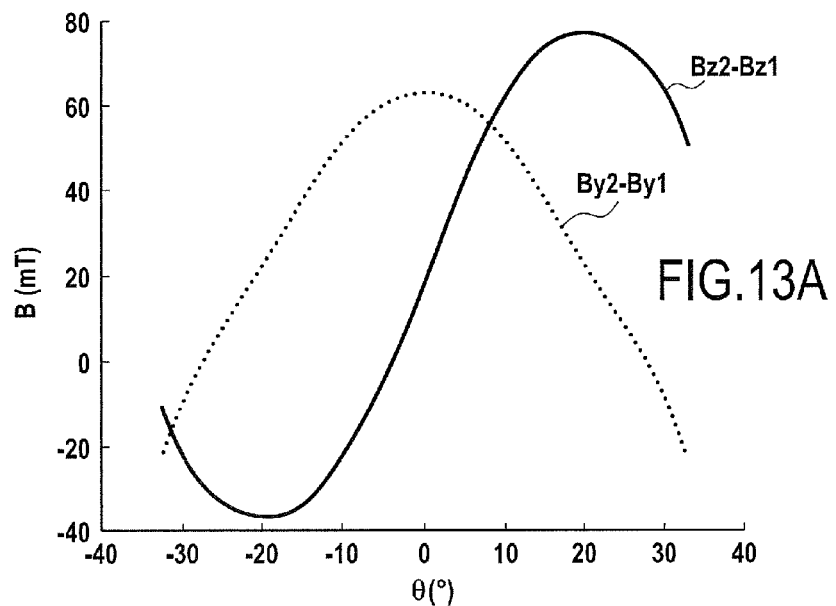
Figure 13B:
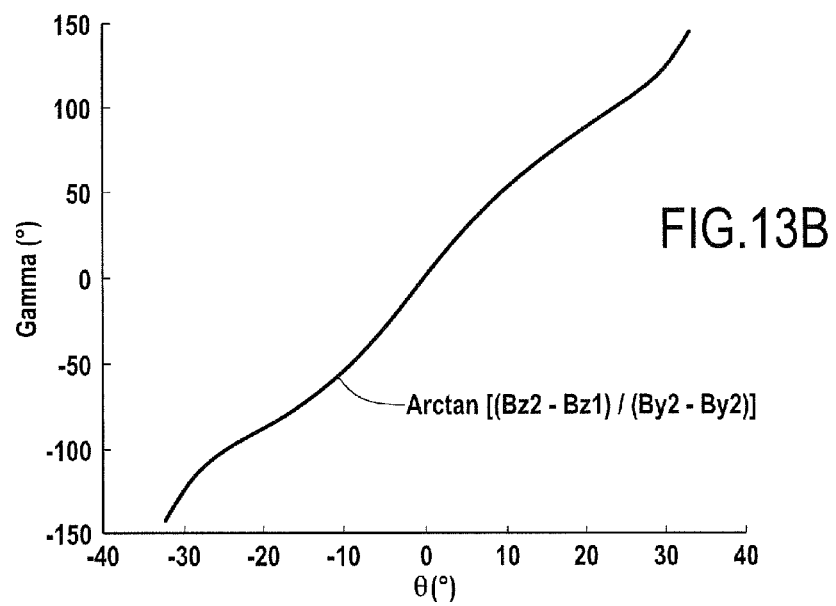

FIGS. 13A and 13B illustrate results obtained by simulation showing, for a configuration with two measurement cells, respectively on the one hand a value representative of the difference of the first components, and on the other hand a value representative of the difference of the second components of the field at each of the two measurement points, and on the other hand a raw angle, or magnetic angle, which can be deduced from these components, as a function of the angular position of the two parts; and FIG. 14 illustrates one variant of the invention to obtain a magnetized body including a first angular portion and a second angular portion distinct from each other, each having their own magnetization plane.

The Figures illustrate embodiments of a magnetic position sensor system 1 allowing the implementation of a method for determining the relative angular position according to the invention.

In these first embodiments, the sensor system 1 is designed to determine the relative position of two parts 14, 16 which are likely to move with respect to each other on the one hand along a rotational movement of axis A. In the examples, there is no other axis of relative displacement. It is considered that the two parts 14, 16 have no relative movement along the radial directions with respect to the axis of rotation A. The sensor system 1 can thus for example be used to detect the position of the automatic gearbox control lever, the sensor system being for example arranged at a hinge shaft of the lever.

The sensor system 1 includes on the one hand a magnetized body 10 with permanent magnetization $\vec{M}$, and at least one magnetic field measurement cell 11, 12. In some embodiments, two measurement cells 11, 12 will be provided. In a practical application, the magnetized body 10 is intended to be fixed to a first part 14 of a mechanism, for example a rotating hinge shaft of a lever, a steering column or an output shaft of an actuator, which is movable with respect to a second part 16 of the mechanism, for example a fixed part of the structure of the vehicle or of a support part of the sensor system 1.

The sensor 1 is provided to determine the relative angular position of the magnetized body 10 with respect to the measurement cell or with respect to the measurement cells 11, 12, about the axis of rotation A. The relative movement between the magnetized body 10 and the measurement cell(s) 11, 12, which is a simple rotation in the considered example, can therefore be described in an orthogonal reference frame (O, $\vec{Xo},\vec{Yo},\vec{Zo}$), the base vectors $\vec{Xo}$ and $\vec{Yo}$ being contained in a plane perpendicular to the axis of rotation A, the point of origin 0 being a point on the axis of rotation A, and the directions of the base vectors $\vec{Xo}$ and $\vec{Yo}$ being arbitrary but orthogonal to each other. As a result, the base vector $\vec{Zo}$ is parallel to the axis of rotation A. In this reference frame, it is for example possible to consider that the directions of the base vectors $\vec{Xo}$ and $\vec{Yo}$ are linked to the second part 16 which carries the measurement cell(s) 11, 12.

In the illustrated example, the radial base vector $\vec{Xo}$ is oriented such that a radius derived from the axis of rotation A and oriented along this radial base vector $\vec{Xo}$ passes through the measurement point of the cell, arbitrarily through that of the first measurement cell 11 in a two-cell system. In this reference frame, the first part 14 is movable and the second part 16 is fixed, but this is arbitrary insofar as only one relative movement between the two parts 14, 16 is considered.

The magnetized body 10 has a geometry in the shape of an angular curved sector about a main axis A', which in the sensor system is preferably parallel to the axis of rotation A. Preferably, the main axis A' is coincident with the axis of rotation A.

In the illustrated example, the magnetized body 10 has a geometry in the shape of an angular sector which is cylindrical about the main axis A', that is to say a volume formed by a straight generatrix, parallel to the main axis A', following a closed curve, in an angular sector about the main axis A'. More specifically, it can be provided, which is the case in the illustrated examples, that the magnetized body 10 has a geometry in the shape of an angular sector which is cylindrical of revolution about the main axis A'. In some examples, the magnetized body 10 more specifically has the shape of a segment of a tubular sector which is cylindrical of revolution about the main axis A'. It could also have the shape of a segment of an angular sector of a disc which is cylindrical of revolution about the main axis of rotation A', therefore in the form of a "portion of a pie chart".

In the illustrated examples, the magnetized body 10 has an extent of less than 360 degree angle about the main axis A'. It then presents an "annular sector" geometry having the shape of a segment of a sector of a tube which is cylindrical of revolution about the main axis A', angularly delimited about the main axis A' by two side faces 9 parallel to the main axis A'. The angular extent of the magnetized body 10 is preferably greater than the relative angular stroke along which it is desired to be able to determine the position of the two parts 14, 16. However, in some cases, it is possible to have a magnetized body with an angular extent of less of than or equal to the relative angular stroke. In some illustrated examples, the magnetized body 10 is in the shape of a segment of a tube which is cylindrical of revolution about the main axis A' having an angular extent comprised in the range from 70 to 100 degree angle. However, the angular sector could have an angular extent comprised in the range from 20 to 120 degree angle, even an angular extent greater than 120 degree angle, until being close or equal to 180 degree angle about the main axis A'.

Figure 9:
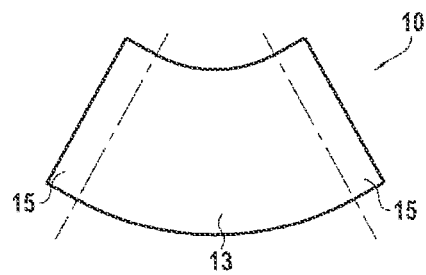
FIG. 9 illustrates one variant of a magnetized body.

FIG. 9 illustrates another possible example for the geometry of the magnetized body 10. In this case, in top view, the magnetized body has a central portion 13 with the same geometry as the magnetized body of FIGS. 1 to 4, namely a geometry which is cylindrical of revolution about the main axis A'. However, in this variant, this central portion 13 is extended at each end of its angular extent by rectilinear end segments 15 which extend it on either side by extending, about the main axis A', tangentially in the extension of the central portion 13, from the angular ends of the central portion 13. These rectilinear end segments have, in the example, the same section as the central portion. The edges of the rectilinear end segments 15 are, in this example, chamfered with a quarter-circle chamfer. In total, this magnetized body 10 is also in the shape of an angular curved sector about its main axis A'.

In the illustrated examples, the magnetized body 10 is made in one piece extending over the entire angular extent. However, it could be made of several magnetized body elements disposed side by side along the angular extent.

Figure 1A:
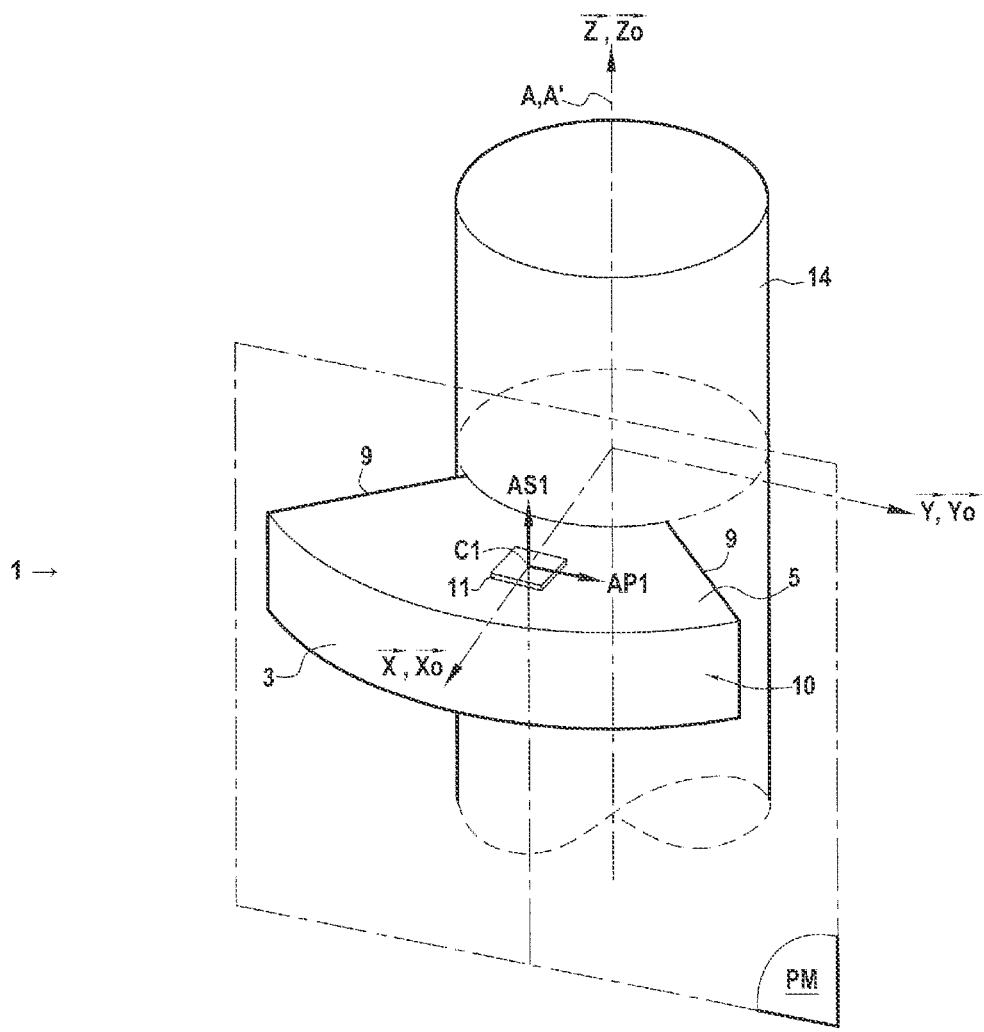
FIG. 1A is a schematic perspective view illustrating one embodiment of a sensor system for implementing the invention and including a single measurement cell.
Figure 1B:
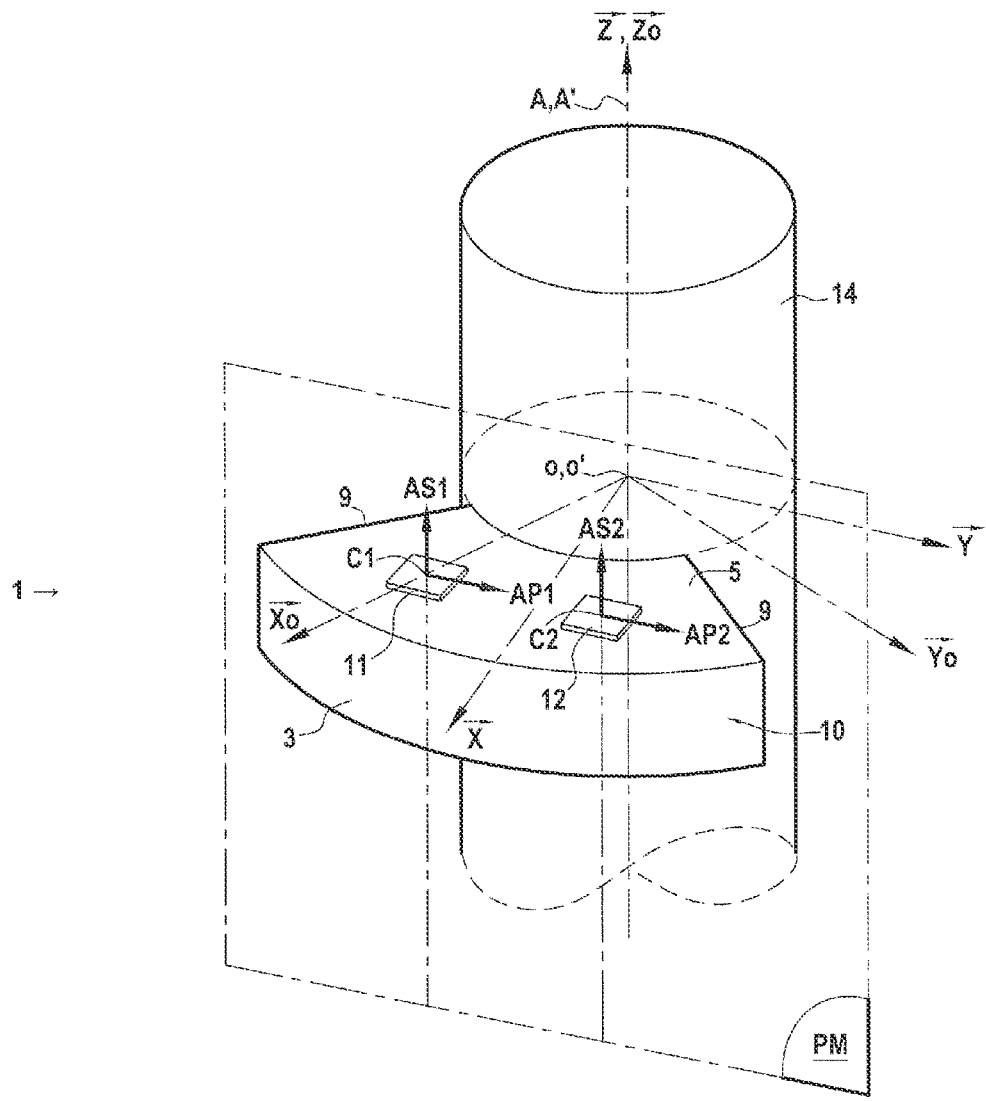
FIG. 1B is a view similar to that of FIG. 1A illustrating one embodiment of a sensor system for implementing the invention and including two measurement cells.

In the example of FIG. 1A or of FIG. 1B, the magnetized body 10 is arranged on a shaft 14, at a distance from the longitudinal ends of the shaft, therefore with segments of the shaft 14 on each side of the magnetized body 10. However, it is possible to provide a configuration in which the magnetized body is arranged at the shaft end, at a longitudinal end thereof. In this case, the magnetized body may have the geometry of a disc or an angular disc sector.

Of course, the magnetized body 10 has a thickness along a radial direction with respect to the axis of rotation A. In some applications, this thickness can be comprised in the range from 2 to 20 millimeters, even comprised in the range from 3 to 15 millimeters, even comprised in the range from 5 to 12 millimeters.

The magnetized body 10 has a front envelope surface 3 which is, in the examples illustrated in FIGS. 1 to 1B, the outer cylindrical surface of revolution of the magnetized body. Typically, in particular for an application for measuring the angular position of a gear lever, the magnetized body may have an outer radius, corresponding to the radius of the front envelope surface 3, which can be comprised in the range from 10 millimeters to 45 millimeters. For other applications, a larger or smaller diameter can be implemented.

The magnetized body 10 is axially delimited by two terminal faces 5, 7. Preferably, at least one of these terminal faces, here for example the planar surface which will be arbitrarily qualified as upper face 5, is a planar surface extending along a plane perpendicular to the main axis A', therefore, in the sensor system 1, perpendicular to the axis of rotation A. In the illustrated example, the two upper 5 and lower 7 opposite terminal faces of the magnetized body 10 are planar surfaces each contained in a plane perpendicular to the main axis A'.

The axial dimension of the magnetized body 10, between its two terminal faces 5, 7 is for example comprised in the range from 2 millimeters to 12 millimeters.

In the method, the magnetized body 10 is preferably arranged so that its main axis A' coincides with the axis of rotation A of the relative movement between the first part 14 and the second part 16. However, a radial offset between the two axes is possible, whether voluntarily or resulting from mounting inaccuracies, for example due to the geometric tolerances of the constituent parts of the mechanism or of their assembly.

During a relative displacement between the measurement cell(s) 11, 12 on the one hand and the magnetized body 10 on the other hand, the measurement cell(s) 11, 12 move relatively facing one of the terminal surfaces, 5, 7 of the magnetized body 10. In the example, it is the upper face 5. In the example, during the relative displacement between the magnetized body 10 and the measurement cells 11, 12, an air gap distance "e" is maintained constant between the measurement cells 11, 12 and the terminal face 5 of the magnetized body 10 along the axial direction of the axis of rotation A. However, it is not excluded that the air gap distance might be variable over at least part of the extent of the operational field.

The relative angular position determination made using the sensor system 1 is made for any relative angular position, between the measurement cell(s) 11, 12 and the magnetized body 10, varying between two distinct extreme relative angular positions about the axis of rotation A, whose angular deviation about the axis of rotation A determines the relative angular stroke.

The examples of FIGS. 1A to 13B consider a magnetized body in the shape of an angular sector including a single angular portion, covering the entire angular extent of the magnetized body 10 about the main axis A', having the same magnetization plane over this entire angular extent of the magnetized body 10.

In such a case, as illustrated more particularly in FIG. 5, at any magnetized point of the magnetized body 10, the magnetization vector $\vec{M}(P)$ of the material constituting the magnetized body 10:

is parallel to a fixed magnetization plane PM for the magnetized body, this magnetization plane PM being parallel to the main axis A' of the magnetized body, therefore, in the sensor system 1, parallel to the axis of rotation A, and has a continuously variable direction in the magnetization plane PM, as a function of the position of the considered point P of the magnetized body in a direction Y perpendicular to the main axis in the magnetization plane PM.

The magnetization plane PM is a fixed plane with respect to the magnetized body. In the examples illustrated in FIGS. 1A to 13B, the magnetization plane PM is perpendicular to a bisector of the angular extent of the magnet. More generally, the magnetization plane PM can be perpendicular to a radius derived from the main axis A' of the angular sector of the magnetized body 10, this radius being comprised in the angular extent of the magnetized body about the axis main A'. This radius derived from the main axis A', to which the magnetization plane PM may be perpendicular, can be comprised a restricted range around the orientation of the bisector of the angular extent of the magnet. The restricted range is for example a range of 15 degree angle, centered on the orientation of the bisector of the angular extent of the magnet.

In the application to a sensor system, it can be provided that the magnetization plane is, preferably, perpendicular to a radius derived from the axis of rotation A and oriented along a bisector of the angular extent of the magnetized body. More generally, the magnetization plane PM can be perpendicular to a radius derived from the axis of rotation, this radius being comprised in the angular extent of the magnetized body about the axis of rotation.

The example of FIG. 14 considers a magnetized body in the shape of an angular sector including at least a first angular portion 10.1 and at least a second angular portion 10.2 distinct from each other about the main axis A', each having their own magnetization plane PM1, PM2.

In such a case, the magnetized body has a magnetization whose magnetization vector:

is parallel to a first fixed magnetization plane PM1, at any point of the first angular portion 10.1 of the magnetized body 10;

is parallel to a second fixed magnetization plane PM2, at any point of the second angular portion of the magnetized body, and has a continuously variable direction in the considered magnetization plane as a function of the position of the point of the considered angular portion of the magnetized body along a direction perpendicular to the main axis A' in the considered magnetization plane.

In such a case, it is then considered that different angular portions of the magnetization body each correspond to an associated magnetization plane.

It can be provided that, for each angular portion, the magnetization plane PM is perpendicular to a radius derived from the main axis A' and comprised in the angular extent of the considered angular portion.

By stipulating that the magnetization vector is parallel to a fixed magnetization plane, it is understood that at each point of the magnetized body or of the associated annular portion of the magnetized body, the magnetization vector is parallel to this plane. The magnetization plane is therefore a theoretical plane which indicates the orientation of this vector for all the points of the magnetized body or of the associated annular portion of the magnetized body. The notion of parallelism must be interpreted with regard to the usual technique in the field of the magnetic fields and in particular the magnetization of the magnetized bodies. On the one hand, it is known that the magnetization is subjected to edge effects which can locally modify the magnetization in the vicinity of the outer surfaces of the magnetized body. At these points, there may not be strict parallelism of the magnetization vector with the magnetization plane which is a theoretical plane. Likewise, it is known that defects in the homogeneity of the magnetic material can locally affect the magnetization. The magnetization plane must therefore be understood as representative of the magnetization at each point of the magnetized body or of the associated annular portion of the magnetized body, taken or taken as a whole, while mainly taking into account the points which are not affected by the edge effects or the clearly unwanted homogeneity defects, therefore in particular the points at the core of the magnetized body or of the associated annular portion of the magnetized body.

The illustrated examples have illustrated the case where the magnetization plane(s) is/are strictly parallel to the axis of rotation A and/or the main axis A'. It is understandable that the notion of strict parallelism or parallelism of the magnetization plane with respect to the axis of rotation A and/or the main axis A' must also be assessed here with regard to the usual technique in the field of the magnetic fields and in particular the magnetization of the magnetized bodies. It should also be assessed compared to the prior art, where the magnetization plane is perpendicular to the axis of rotation A and/or the main axis A'. It must also be assessed with regard to the advantages and benefits of the invention, which are in particular the simplicity of production of the magnetized body and, as will be seen below, the compactness, along the radial direction with respect to the axis of rotation A and/or the main axis A', of the sensor system which can be made with such a magnetized body.

Also, within the meaning of the present invention, it will be considered that the magnetization plane(s) is/are strictly parallel to the axis of rotation A and/or the main axis A' if they form with the considered axis an axis of less than 5 degrees. It will be considered that the magnetization plane(s) is/are parallel to the axis of rotation A and/or the main axis A', if they form with the considered axis an angle of inclination of less than 30 degrees, preferably less than 20 degrees. Under these conditions, it will be considered that the magnetization plane of the magnetized body/bodies PM, PM1, PM2 is/are parallel to the axis of rotation A and/or the main axis A'.

For the following description, it is possible to define an orthogonal reference frame (O', $\vec{X}$, $\vec{Y}$, $\vec{Z}$) whose:
- point of origin 0' is a point of the main axis A', preferably the center of the magnetized body 10 along the direction of the main axis A',
- directions of the base vectors $\vec{X}$ and $\vec{Y}$ are arbitrary but orthogonal to each other and contained in a plane perpendicular to the main axis A', therefore perpendicular to the axis of rotation A,
- base vector $\vec{Zo}$ is parallel to the main axis A', therefore can be coincident with the base vector $\vec{Z}$ of the reference frame linked to the second part 16.

This reference frame is linked to the magnetized body 10, therefore the directions of the base vectors $\vec{X}$ and $\vec{Y}$ are linked to the magnetized body 10. In the following example, the center O' of the reference frame linked to the magnetized body can be coincident with the center O of the reference frame linked to the second part 16.

For convenience, the situation is more particularly described for the cases where the magnetized body includes a single magnetization plane for its entire angular extent, and where this magnetization plane is perpendicular to the bisector of the angular extent of the magnetized body 10 about the main axis A'. In this case, it is advantageously possible to take as a direction of the base vector $\vec{X}$ the direction of the bisector of the angular extent of the magnetized body 10 about the main axis A'. In this case, the magnetization plane PM is perpendicular to the direction of the base vector $\vec{X}$, and any parallel plane PMi, is defined by the directions of the vectors $\vec{Y}$, $\vec{Z}$. As seen in FIG. 5A, in a given plane PMi, parallel to the magnetization plane, a point $P(x_i, y, z)$ of the magnetized body can therefore be defined by its coordinates $(x_i, y, z)$, the value $x_i$ being identical for all the points of the given plane PMi. In such a plane, the magnetization vector $\vec{M}(P)$ can be defined by its coordinates $(m_y, m_z)$, or by its orientation with respect to the base vector $\vec{Y}$, which can be represented by the angle $a_{yz}$ between the magnetization vector $\vec{M}(P)$, at the considered point P, and the base vector $\vec{Y}$. This angle $a_{yz}$ represents the orientation of the magnetization vector at the point $P(x_i, y, z)$ of the magnetized body.

The magnetization vector $\vec{M}(P)$ has a continuously variable direction in the plane PMi, as a function of the position of the considered point P of the magnetized body along the direction Y perpendicular to the main axis in the magnetization plane PMi. In this manner, the function $a_{yz}(y)$ is a continuously variable function over the extent of the segment of the magnetized body contained in the considered plane PMi, for y varying according to the position of the point in the direction of the base vector $\vec{Y}$. This property is valid over the entire extent of the magnetized body if there is a single angular portion covering the entire angular extent and associated with a single magnetization plane, or over an angular portion considered if there are several distinct angular portions each corresponding to a magnetization plane.

Preferably, over the extent of the angular portion of the magnetized body 10 about the main axis A', corresponding to the considered magnetization plane, the orientation of the orientation vector $\vec{M}(P)$ has a different value for any position along the axis Y. Thus, over the extent of the angular portion of the magnetized body 10 about the main axis A', the orientation of the orientation vector $\vec{M}(P)$ varies over less than 360 degree angle. On the other hand, to promote the accuracy of the determination of the angular position, a magnetized body is preferably used for which, over the angular extent of the magnetized body 10 about the main axis A', the orientation of the orientation vector $\vec{M}(P)$ varies continuously over more than 180 degree angle, preferably more than 270 degree angle, but over less than 360 degree angle.

Preferably, the magnetization vector $\vec{M}(P)$ has, for the points of the considered angular portion of the magnetized body contained in the plane PMi, a constant or almost constant direction for all the points having a given position along the direction Y perpendicular to the main axis in the magnetization plane PMi. In this manner, the function $a_{yz}(z)$ is a constant or almost constant function with respect to the variation of $a_{yz}(y)$, for a given value of y over the extent of the segment of the magnetized body contained in the considered plane PMi. However, a variation of the function $a_{yz}(z)$ is admissible. Such a variation will be preferably comprised between 0 and 30 degree angle.

In some embodiments, the direction of the magnetization vector varies linearly or almost linearly as a function of the position of the considered point in the magnetized body along the direction of the base vector $\vec{Y}$. For example, the function $a_{yz}(y)$ is a continuously linear or almost linear function in the considered plane PMi.

In the case of FIG. 5 and FIG. 5a, and if Ts refers to the spatial period of the variation, that is to say the distance separating, along the direction of the base vector $\vec{Y}$, two points for which the magnetization vector would have the same direction, expressed in the unit of measurement of the coordinate y, the expression of this magnetic angle $a_{yz}(z)$ having a linear variation and depending only on the direction y will be written:

$$a_{yz}(y) = \frac{2\pi}{Ts}y + \frac{\pi}{2}$$

Preferably, in particular by implementing the magnetization method which will be described below, the magnetization vector $\vec{M}(P)$ will be invariant or almost invariant along the direction perpendicular to the magnetization plane PM.

For the cases where the magnetized body includes a single magnetization plane for all its angular extent, the expression of this magnetization vector will then, in the reference frame (O', $\vec{X}$, $\vec{Y}$, $\vec{Z}$) linked to the magnetized body 10, be:

$$\vec{M}(P)\begin{cases} M_x = 0 \\ M_y = M \cdot \cos(a_{yz}(y)) \\ M_z = M \cdot \sin(a_{yz}(y)) \end{cases}$$

In the practical realization, the function $a_{yz}(y)$ can be non-linear and can also be used to:
- manage the edge effects of the magnetic field created by the magnet;
- impose a desired linear or, on the contrary, non-linear response of the sensor system.

Indeed, there is also proposed a method for manufacturing a magnetized body for a system for determining a relative angular position, in particular for implementing a method according to the invention.

In this method, there is provided a body of magnetizable material having a shape as defined above. The magnetizable material is in particular a ferromagnetic material, in particular hard ferromagnetic, ferrimagnetic or antiferromagnetic material, capable of forming, after a controlled magnetization, a permanent magnet. Such materials include alloys, for example of neodymium, of iron and of boron (Nd2Fe14B) of Samarium and of Cobalt (SmCo5 and Sm2Co17), and the ferrites, as well as the AlNiCo.

Figure 7:
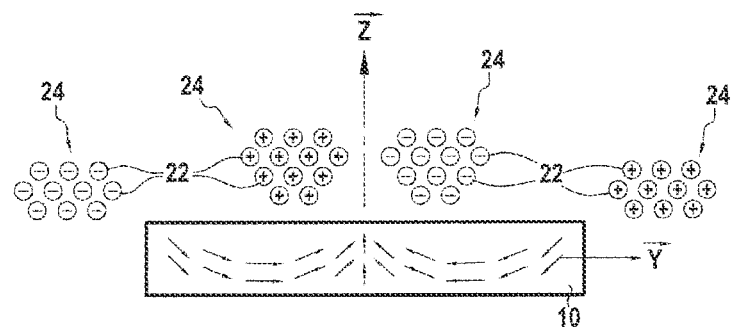
FIG. 7 is a schematic front view, along the direction of a radius perpendicular to the axis of rotation, illustrating a magnetization method for making a magnetized body of a sensor system for implementing the invention.

There is first interest on the case where the magnetized body includes a single magnetization plane for its entire angular extent. For the implementation of the method, there is disposed, as illustrated in FIGS. 6 and 7, in the vicinity of the body of magnetizable material 10, a network 20 of parallel electrical conductors 22 comprising several bundles 24 of parallel electrical conductors, each oriented along an axis perpendicular to the main axis A'. The orientation of the electrical conductors, hereinafter referred to as magnetization conductors 22, is, in a plane perpendicular to the main axis A, preferably comprised in an angular range defined by the two radiuses R1 and R2 derived from the main axis A' and passing through the angular ends of the magnetized body about the main axis A', therefore, in the illustrated example, passing through the side faces 9.

The orientation of the magnetization conductors 22 will determine a preferential relative angular position of the magnetized body 10 with respect to the measurement cells 11, 12 the one for which the accuracy of measurement of the angular position by the sensor system 1 is in theory the greatest. This position corresponds to the angular position on the magnetized body 10 defined by a radius derived from the main axis A' and having the orientation of the magnetization conductors 22. Moving away from the reference position increases the risk of reducing the measurement accuracy. To obtain optimum accuracy over the entire angular stroke of the sensor system 1, it may be interesting that the preferential angular position is arranged at half of the angular stroke. In this case, it could be provided that the orientation of the magnetization conductors corresponds to the orientation of a bisector of the angular extent of the magnetized body 10, or at least that it is comprised in a restricted range around the orientation of the bisector. The restricted range is for example a range of 15 degree angle, centered on the orientation of the bisector.

"Bundle 24 of magnetization conductors 22" refers to a group of magnetization conductors in which, at a given time, the current flows in the same direction and which are not separated by a magnetization conductor 22 in which the current flows in another direction, in the reference frame linked to the magnet. A bundle 24 may comprise a single magnetization conductor 22 or, preferably, several magnetization conductors 22, for example in the range from 4 to 40 magnetization conductors 22 for a bundle 24. Different bundles 24 may comprise a different number of magnetization conductors 22.

In a bundle 24, some of the magnetization conductors 22 or all of the magnetization conductors 22 may be abutted to each other. In this case, it can be provided that the magnetization conductors 22 are electrically insulated from each other, for example by an insulating sheath. Conversely, one or several magnetization conductor(s) 22 of a bundle 24 can be transversely spaced apart from other magnetization conductors of the same bundle 24, or all of the magnetization conductors 22 can be spaced apart from each other. A bundle 24 may comprise an outer envelope, for example made of electrically insulating material, surrounding the magnetization conductors 22 of the bundle.

In the example of FIGS. 6 and 7, four bundles 24 have been illustrated. In two of the bundles 24, the current flows along a first direction according to the orientation of the magnetization conductors, while in the two other bundles, the current flows along a second direction, opposite to the first one.

A magnetization conductor 22 consists preferably of a wire or a rod made of conductive material, for example copper, extended according to the orientation.

The bundles 24 are laterally offset from each other along an offset direction perpendicular to their orientation and perpendicular to the main axis A'. This offset direction is parallel to the magnetization plane that is sought to be created. In the examples illustrated in FIGS. 7, 10 and 11, the bundles 24 are aligned along the offset direction. However, some of the bundles 24 could be, in addition, offset from the other bundles along a direction perpendicular to the magnetization plane that it is sought to be created. They are preferably disposed in the immediate vicinity of the body of magnetizable material, preferably in the immediate vicinity of the terminal surface facing which will be disposed the measurement cells 11, 12 in the sensor system 1, therefore the upper terminal surface 5 in the illustrated example.

Typically, the bundles are disposed at less than 10 mm from the terminal surface or less than 5 mm from the terminal surface.

The method naturally involves the flow of an electric current in the bundles of magnetization conductors 22, the direction of flow of the current being, at a given time, for example a time for which the intensity of the current is maximum, identical in all the magnetization conductors 22 of the same bundle 24, and being reversed in two adjacent bundles 24.

By this flow of the electric current, it is thus possible to distinguish one or several outgoing bundle(s) 24, forming an outgoing group of bundles, in which, at a given time, for example a time for which the intensity of the current is maximum, the current flows along the first direction, and one or several incoming bundle(s) 24, forming an incoming group of bundles, in which, at the same given time, the current flows along the second direction, opposite the first one.

In this manner, the electric current flowing in the bundles 24 is able to generate, around the network 20 and therefore in the body of magnetizable material, a magnetization magnetic field suitable for magnetizing the body of magnetizable material. In particular, this electric current must have a maximum sufficient intensity value. By disposing the bundles 24 perpendicularly to the main axis A', and by alternating the outgoing bundles and the incoming bundles, it is possible to generate a magnetic field suitable for imparting, to the body made of magnetizable material, a magnetization as described above.

In particular, the magnetic field created by the network of magnetization conductors is preferably able to magnetically saturate the magnetizable material at any point thereof. Once thus magnetized, the body made of magnetizable material can serve as a body of magnetic material 10 in a method and in a sensor system 1 according to the invention.

For that, in particular the following parameters can be adapted:
intensity of the electric current in a bundle, and therefore in a conductor, taking into account in particular the maximum intensity;
conductor bundle density;
relative positioning of the bundles and conductors in a bundle;
number of conductors per bundle;
spacing of the bundles with respect to the body of magnetizable material, and in particular with respect to the front envelope surface 3 of the magnet, as well as with respect to the upper terminal surface, along the direction of the main axis;
etc. . . . .

In the example of FIG. 7, the network of conductors includes two outgoing bundles and two incoming bundles, disposed alternately. A first outgoing bundle and a first incoming bundle are disposed symmetrically on either side of a plane of symmetry of the magnetized body containing the main axis A', within the limits defined by the side faces 9 of the magnetized body 10. A second outgoing bundle and a second incoming bundle are disposed symmetrically on either side of the plane of symmetry of the magnetized body containing the main axis A', outside the limits defined by the side faces 9 of the magnetized body.

Figure 10:
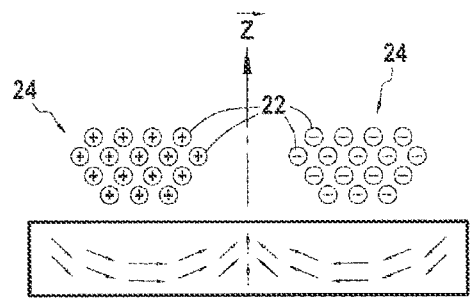
FIGS. 10 and 11 are views similar to those of FIG. 7, illustrating variants of a magnetization head to make a magnetized body of a sensor system for implementing the invention.

In the example of FIG. 10, the network of conductors includes only one outgoing bundle and one incoming bundle disposed symmetrically on either side of a plane of symmetry of the magnetized body containing the main axis A'. In the example, they are disposed within the limits defined by the side faces 9 of the magnetized body.

Figure 11:
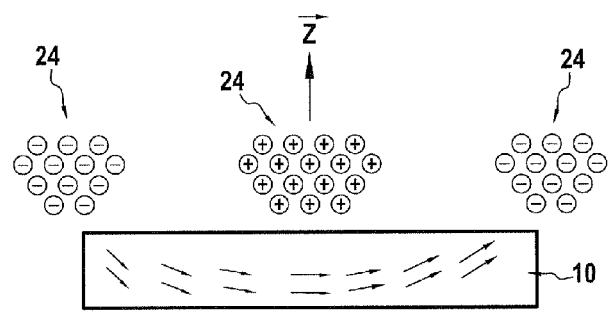

In the example of FIG. 11, the network of conductors includes an outgoing bundle and two incoming bundles. The reverse configuration is possible, with one incoming bundle and two outgoing bundles. The single bundle, here the outgoing bundle, is disposed on the plane of symmetry of the magnetized body containing the main axis A'. The two bundles in the same direction, here the two incoming bundles, are disposed symmetrically on either side of the plane of symmetry of the magnetized body containing the main axis A'. In the example, they are disposed at the limits defined by the side faces 9 of the magnetized body.

It is noted that different bundles 24 do not necessarily include the same number of conductors. For example, the number of conductors per bundle 24 may decrease while moving away from the plane of symmetry of the magnetized body containing the main axis A'.

In the outgoing group of bundles 24, on the one hand, and in the incoming group of bundles 24, on the other hand, it can be provided that several bundles 24, or all of the bundles 24, are electrically supplied in parallel. Likewise, in a given bundle 24, it can be provided that several magnetization conductors 22 or all of the magnetization conductors 22 are electrically supplied in parallel.

However, preferably, it will be provided that several bundles 24, or all of the bundles 24, including outgoing bundles and incoming bundles, are electrically connected in series. It will be provided that several magnetization conductors 22, or all of the magnetization conductors 22, including outgoing magnetization conductors and incoming magnetization conductors, are electrically connected in series to form one or several magnetizing coil(s).

It can thus be provided that the magnetization conductors 22 of the bundles are formed by segments of at least one coil winding for a conductive wire along which at least a magnetization conductor 22 of an outgoing bundle, a connecting segment, and a magnetization conductor 22 of an incoming bundle, another connecting segment and another magnetization conductor 22 of an outgoing bundle, follow each other repeatedly. Thus, within a network, it is possible to group together all the magnetization conductors 22 into a single coil winding, into two coil windings or into more than two coil windings.

In another embodiment (not represented), a network of conductors could be formed of a grid including, on one side of the body made of magnetizable material, a first bar of connection to a first electric potential, and, on the other side of the body made of magnetizable material, a second bar of connection to a second electric potential. Each conductor of the network could then take the form of a rectilinear segment whose length would correspond to the distance between the bars, each conductor extending between the two bars and being connected through its two ends respectively to the first and to the second connecting bar.

The magnetization conductors 22 have a length according to their orientation which extends between two supply heads which can for example each be constituted by the connecting segment within the framework of a winding, or by a connecting bar within the framework of a bundle formed of a grid. In the supply heads, the electric current can flow along a direction transverse or substantially transverse to the orientation of the conductors. It is desirable to limit the magnetic influence of these currents, to limit the disturbances on the magnetization of the body of magnetizable material, and it is therefore desirable that the magnetization conductors have sufficient length to achieve this aim. The magnetization conductors 22 will thus have a length greater than the extent of the body of magnetizable material according to the orientation of the magnetization conductors 22.

FIG. 14 schematically illustrates a method for making a magnetized body including a first angular portion 10.1 and at least a second angular portion 10.2 distinct from each other about the main axis A', the magnetized body having a magnetization whose magnetization vector is such that:
at any point of the first angular portion 10.1 of the magnetized body, the magnetization vector is parallel to a first fixed magnetization plane PM1, at any point of the second angular portion 10.2 of the magnetized body, the magnetization vector is parallel to a second fixed magnetization plane PM2, and the magnetization vector has a continuously variable direction in the considered magnetization plane PM1, PM2, as a function of the position of the point of the magnetized body of the considered angular portion along a direction perpendicular to the main axis A' in the considered magnetization plane.

For that, the method provides a first network 20.1 of parallel electrical conductors extending facing a first portion of the body of magnetizable material. The first network comprises several bundles 24.1 of parallel electrical conductors 22 having an orientation X1 perpendicular to the main axis A' and parallel to a first directrix radius derived from the main axis A' and which is comprised in the angular extent of the first considered angular portion 10.1 of the magnetized body.

This first network includes at least one outgoing bundle and at least one incoming bundle.

A second network 20.2 of parallel electrical conductors is also provided, which extends facing a second portion of the body of magnetizable material, distinct from the first portion. The bundles 24.2 of parallel electrical conductors 22 of the second network 20.2 are oriented along a second orientation X2 perpendicular to the main axis (A') and parallel to a second directrix radius derived from the main axis (A') and comprised in the angular extent of the second considered angular portion 10.2.

The second bundle has at least one outgoing bundle and at least one incoming bundle.

By creating differentiated magnetization planes in the two angular portions, it is possible to obtain optimum accuracy over the entire angular stroke of the sensor system 1, in particular for sensor systems having a magnetized body with a large angular extent. To further optimize the accuracy, it can be provided that the orientation of the magnetization conductors of each of the networks 20.1, 20.2 corresponds to the orientation of a bisector of the angular extent of the corresponding angular portion 10.1, 10.2 of the magnetized body 10, or at least that it is comprised in a restricted range around the orientation of this bisector. The restricted range is for example a range of 15 degree angle, centered on the orientation of the bisector.

Of course, the principle of having several magnetization planes, as described above with reference to FIG. 14, with two differentiated magnetization planes for two distinct angular portions, can be declined to three, four or more differentiated magnetization planes for as many distinct angular portions.

As seen above, in the illustrated examples, the sensor system 1 can include a single measurement cell or can include at least two measurement cells. In the case of the presence of two measurement cells, the measurement points C1 and C2 of the first and of the second cell 11, 12 are preferably arranged in the same plane perpendicular to the axis of rotation A, axially offset along the direction of the axis of rotation A with respect to the upper terminal face 5 of the magnetized body 10. In the sensor system 1, the cell 11 or each of the two measurement cells 11, 12 determines, at a corresponding measurement point C1, C2, values representative of the orientation of the magnetic field B created by the magnetized body 10 at these measurement points C1, C2. Each measurement cell 11, 12 delivers at least two electrical, for example digital and/or analog, signals representative respectively of a primary component and a secondary component of the vector representative of the magnetic field B induced by the magnetized body 10 at the measurement point of the considered cell, respectively along a primary measurement axis AP1, AP2 and along a secondary measurement axis AS1, AS2 which are orthogonal to each other and contained in a plane parallel to the axis of rotation A. Of course, the invention covers embodiments that can implement measurement cells having higher capacities, for example delivering more than two signals and/or signals representative for example of more than two components of the vector representative of the magnetic field B induced by the magnetized body 10 at the measurement point of the considered cell.

In the example which will be described in more detail below, it will be possible to use, for the determination of the relative angular position, only two electrical signals representative respectively of a primary component and a secondary component of the vector representative of the magnetic field B induced by the magnetized body 10 at the measurement point of the considered cell, this even if the used cell would be capable of giving the three components. These two components therefore define, for each cell, a two-dimensional measurement plane.

In the exemplary embodiment including a single measurement cell 11, illustrated in FIG. 1A, the primary measurement axis AP1 is preferably parallel to the axis of rotation A, and perpendicular to the radial base vector $\vec{Xo}$, and therefore parallel to the base vector $\vec{Yo}$, therefore tangential with respect to a rotation about the axis of rotation A. Otherwise, preferably, the measurement plane is perpendicular to the radial base vector $\vec{Xo}$, which forms a radius derived from the axis A and passing through the measurement point.

In the exemplary embodiment including two cells 11, 12, illustrated in FIG. 1B, the measurement planes of the two measurement cells 11, 12 are parallel to each other, and even coincident. For that, the primary measurement axes AP1, AP2 of the two measurement cells 11, 12 are chosen to be contained in the same plane parallel to the axis of rotation A, therefore parallel to a plane defined by the base vectors $\vec{Xo}$ and $\vec{Yo}$. Moreover, in the exemplary embodiment including two cells 11, 12, the primary measurement axes AP1, AP2 of the two measurement cells 11, 12 are parallel to each other and parallel to the axis of rotation A, therefore parallel to the direction of the base vector $\vec{Zo}$. Otherwise, the measurement plane of the measurement cells 11, 12 is preferably parallel to the axis of rotation A.

Furthermore, in both examples, the measurement plane of the measurement cell or of each of the measurement cells 11, 12 can be parallel to the magnetization plane of the magnetized body 10 for a reference position between the first part 14 and the second part 16, that is to say for a reference position between the magnetized body 10 and the cells 11, 12. This reference position is preferably comprised in the angular stroke between the first part 14 and the second part 16, that is to say, in the relative angular stroke between the magnetized body 10 and the cells 11, 12.

In the exemplary embodiment including a single cell 11, illustrated in FIG. 1A, it has been provided that the reference position, for which the measurement plane of the cells is strictly parallel to the magnetization plane, corresponds to the position for which the measurement cell 110 is disposed facing the preferential position determined by the orientation of the electrical conductors during the magnetization of the magnetized body in the case where the magnetization method above is used. In the exemplary embodiment including two cells 11, 12, illustrated in FIG. 1B, it has been provided that the reference position, for which the measurement plane of the cells is strictly parallel to the magnetization plane, corresponds to the position for which the measurement cells 11, 12 are disposed symmetrically with respect to the preferential position determined by the orientation of the electrical conductors during the magnetization of the magnetized body in the case where the magnetization method above is used.

In the two illustrated examples, this reference position, for which the measurement plane of the cell(s) is strictly parallel to the magnetization plane, is arranged at half of the angular stroke. It is illustrated more particularly in FIG. 2A for the exemplary embodiment including two cells 11, 12, it can be provided that this reference position is comprised in a restricted range around the bisector of the angular stroke. The restricted range is, for example, a range of 15 degree angle, centered on the orientation of the bisector. In other variants, this reference position could correspond to one end of the angular stroke.

In the exemplary embodiment including a single cell 11, the first measurement point C1 of the first measurement cell 11 is arranged at a distance R from the axis of rotation A. This distance is such that the measurement point C1 is arranged facing the upper terminal face 5 of the magnetized body, preferably for the entire angular stroke of the sensor system.

In the exemplary embodiment including two cells 11, 12, the first measurement point C1 of the first measurement cell 11 and the second measurement point C2 of the second measurement cell are arranged at equal distance R from the axis of rotation A. This distance is such that the measurement points C1 and C2 are also arranged facing the upper terminal face 5 of the magnetized body, preferably for the entire angular stroke of the sensor system.

Thus, in both cases, it is possible to dispose the measurement point(s) of the measurement cell(s) at a distance R from the axis of rotation A, which is smaller than the radius of the front envelope surface 3 of the magnetized body, forming the outer radius of the magnetized body.

This arrangement is particularly advantageous because it allows limiting the space requirement of the sensor system along the radial direction with respect to the axis of rotation A.

Advantageously, in a two-cell system, the two measurement points can be, as illustrated, arranged in positions spaced by a non-zero fixed angle $2\delta$ strictly less than 90 degree angle about the axis of rotation A. Preferably, this spacing angle $2\delta$ is comprised in the range from 1.5 to 30 degree angle, corresponding to a distance between the two measurement points which is for example comprised between 1 mm and 5 mm. The measurement points C1 and C2 of the first and second cells 11, 12 are distinct points, spaced from each other about the axis of rotation A. The minimum distance between the two measurement points must be such that the representative values of the magnetic field created at these two points by the magnetized body differ by a deviation greater than the resolving power of the measurement cells. In other words, the first and second measurement cells must not deliver, as a result of their respective measurements at these two points, the same values representative of the vector representative of the magnetic field.

Furthermore, in this example, the first and second measurement cells 11, 12 are preferably arranged on the second part 16 such that the primary measurement axes AP1 of the first and AP2 of the second measurement cell 11, 12 are parallel to each other, and that the secondary measurement axes AS1 of the first and AS2 of the second measurement cell are parallel to each other. In other words, the two measurement cells 11, 12, in particular their measurement elements, are arranged parallel to each other. Preferably, for each cell, one of the primary measurement axis AP1, AP2 or of the secondary measurement axis AS1, AS2 is parallel to the axis of rotation A.

In the illustrated example, the primary measurement axes AP1, AP2 of the first and second measurement cells 11, 12 are oriented vectorially in the same way, and the secondary measurement axes AS1, AS2 of the first and second measurement cells are also oriented vectorially in the same way. In other words, the two measurement cells 11, 12, in particular their magneto-sensitive elements, are arranged in the same way. However, the primary measurement axes AP1, AP2 of the first and second measurement cells 11, 12 and/or the secondary measurement axes AS1, AS2 of the first and second measurement cells can be vectorially oriented along the two opposite ways of the same direction. In this case, however, it will be necessary to express the algebraic values of the primary and secondary components with respect to the same way, on the same vector base, therefore take into account the opposite value of one of the two algebraic values delivered by the cell.

As in the illustrated exemplary embodiment including two cells 11, 12, the first and second measurement cells 11, 12 can be arranged on the second part 16 such that the primary measurement axes of the first and second measurement cells or the secondary measurement axes of the first and second measurement cells are:
 oriented perpendicularly to the direction of a bisector of the angular deviation between the two measurement points C1, C2, measured about the axis of rotation A in a plane perpendicular to the axis of rotation A, and
 oriented perpendicularly to the axis of rotation A.

Figure 2A:
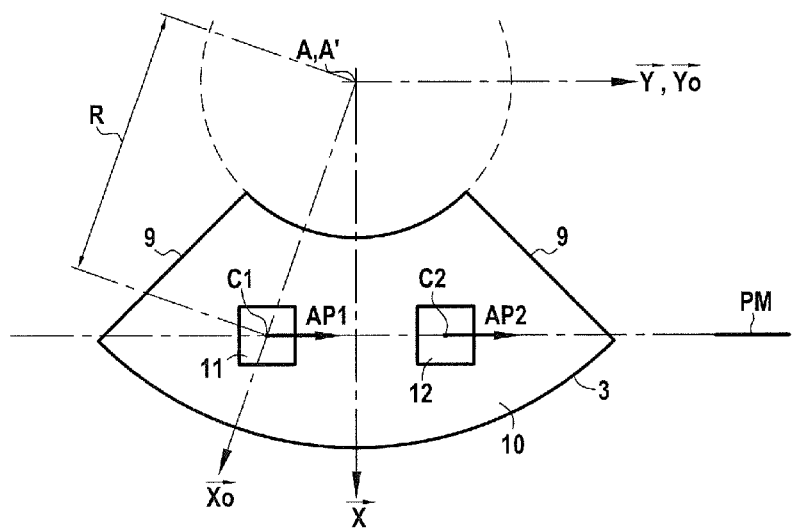
FIG. 2A is a schematic top view, along the direction of the axis of rotation, in a plane perpendicular to the axis of rotation, of the system of FIG. 1B, in a position called reference position of the magnetized body with respect to the measurement cells.
Figure 2B:
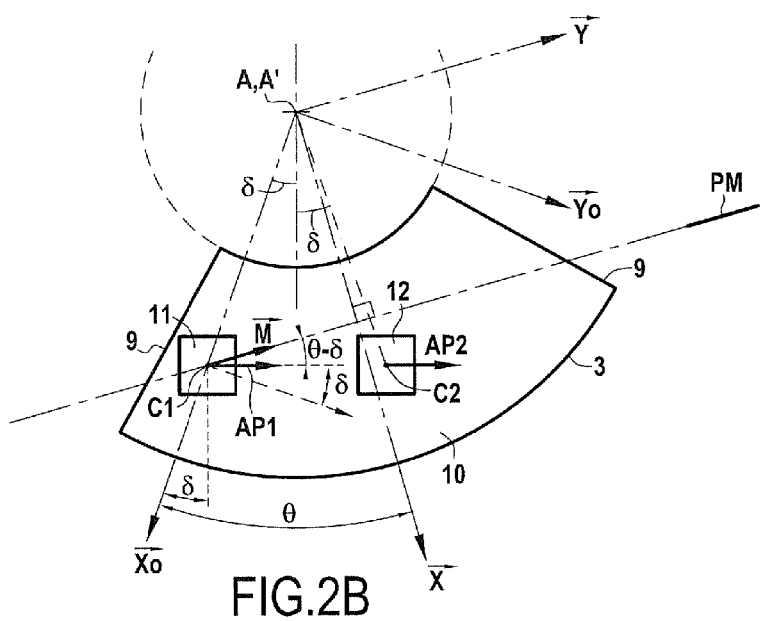
FIG. 2B is a view similar to that of FIG. 2A, for any position of the magnetized body with respect to the measurement cells.

It is thus possible, as illustrated in more detail in FIG. 2B, to provide that the first 11 and second 12 measurement cells are arranged on the second part 16 such that the primary measurement axes AP1, AP2 of the first and second measurement cells 11, 12 are oriented:
 perpendicularly to the direction of a bisector of the angular deviation $2\delta$ between the two measurement points C1, C2, measured about the axis of rotation in a plane perpendicular to the axis of rotation A, and
 perpendicularly to the axis of rotation A.

Figure 3:
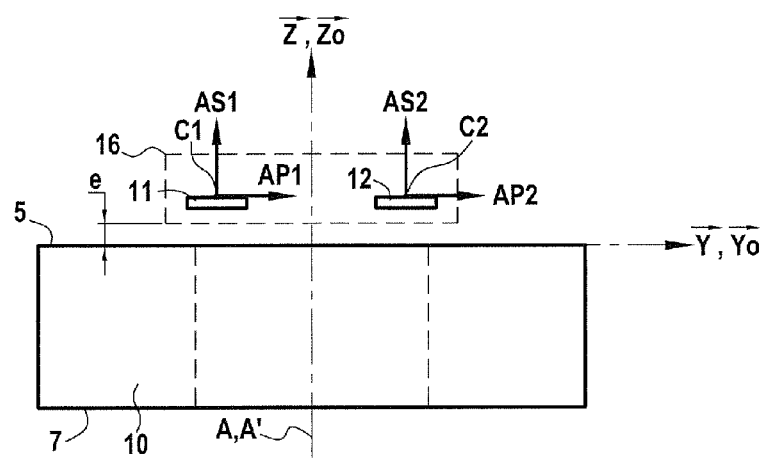
FIG. 3 is a schematic front view, along the direction of a radius perpendicular to the axis of rotation, of the system of FIG. 1B.
Figure 4:
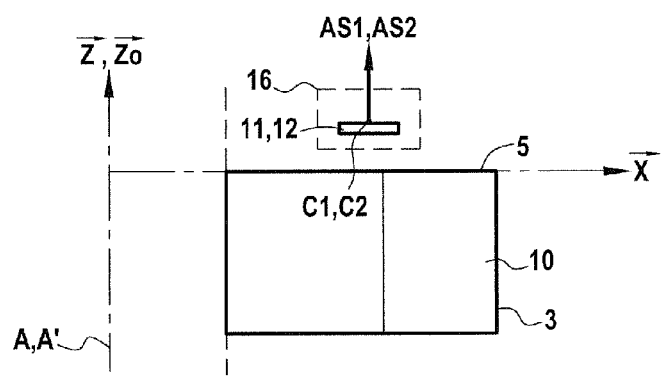
FIG. 4 is a schematic sectional view along a plane containing the axis of rotation, of the system of FIG. 1B.

FIGS. 2 to 4 thus illustrate the case in which the primary measurement axes AP1, AP2 of the first and of the second measurement cells are oriented by forming an angle $\delta$ with respect to the arbitrary direction of the base vector $\vec{Y_o}$. This angle results from the arbitrary choice of the orientation of the radial base vector $\vec{X_o}$, which is chosen to pass through the measurement point C1 of the first cell. It is noted that this angle $\delta$ corresponds to half of the angular deviation $2\delta$ between the two measurement points C1, C2, measured about the axis of rotation A in a plane perpendicular to the axis of rotation A. In addition, the secondary measurement axes AS1, AS2 of the first and second measurement cells are oriented along the direction of the base vector $\vec{Z_o}$. However, still other orientations are possible.

There are many commercially available cells that allow obtaining these measurements.

An example of a cell that can be used in the invention can thus implement a component "MLX90365 Triaxis Position Sensor IC" which is marketed by the company Melexis NV, Rozendaalstraat 12, B-8900 Ieper, Belgium, and described in particular in the documentation "MLX90365 Triaxis Position Sensor IC Datasheet", revision number 5.8, dated 11 Jan. 2016. Other references from the same manufacturer can also be used, such as the references MLX90333 or MLX90364.

This type of measurement cell 11, 12 ensures a measurement of the magnetic field at a single point, by minimizing the number of integrated circuits and simplifying the production by decrease in the number of parts, knowing that each component introduces tolerances related to mounting uncertainties. The notion of measurement at a single point is assessed depending on the spatial resolution of the position measurement delivered by the sensor. Each measurement cell 11, 12 may for example comprise a magneto-sensitive unit generally composed of at least two magneto-sensitive elements, very close to each other until being considered at the same point, and whose outputs are possibly used by a calculation unit of the measurement cell. Very often, the magneto-sensitive unit and the calculation unit are part of the same electronic component, which allows reducing the cost and increasing the reliability of the sensor. It can be envisaged to provide that the two measurement cells 11, 12 are integrated into the same electronic component, which may comprise a calculation unit common to the two cells. However, within the framework of the invention, it can be provided that the two cells are equipped with a communication unit for communicating information to a remote calculation unit, for example housed in an electronic control unit (ECU) or a computer.

With such a type of cell, it is possible to obtain, at each of the measurement points C1, C2, at least two components By, Bz of the vector representative of the magnetic field B created by the magnetized body 10 in an orthogonal reference frame. The two reference frames have different origins, respectively at the considered measurement point C1, C2, but identical base vectors. Natively, a cell delivers electrical signals of the components of the vector representative of the magnetic field B along the primary measurement axis AP1 and along the secondary measurement axis AS1. The first cell 11 allows in particular obtaining, in the measurement plane, a first primary component By1, along the primary measurement axis AP1, of the vector representative of the magnetic field B at the point C1, and a first secondary component Bz1, along the secondary measurement axis AS1, of the vector representative of the magnetic field B created by the magnetized body at the point C1. The second cell 12 allows in particular obtaining, in the measurement plane, a second primary component By2, along the primary measurement axis AP2, of the vector representative of the magnetic field B at the point C2, and a second secondary component Bz2, along the secondary measurement axis AS2, of the vector representative of the magnetic field B created by the magnetized body at the point C2. By simple trigonometry operations, these components can be expressed in the reference frames respectively (C1, $\vec{Yo}$, $\vec{Zo}$) and/or (C2, $\vec{Yo}$, $\vec{Zo}$).

It will be noted that if the measurement plane is not strictly parallel to the magnetization plane, the cell will take measurements in projection. This lack of parallelism is found due to the relative rotation of the magnetized body with respect to the cells. This lack of parallelism can also be due to an inclination between the measurement plane and the magnetization plane about an axis perpendicular to the axis of rotation and/or to the main axis A', and perpendicular to a radius derived from this axis. This inclination amounts to a difference in inclination of the measurement plane and of the magnetization plane with respect to the axis of rotation and/or to the main axis A'. In the invention, this difference in inclination will have little influence if it is less than 30 degree angle, preferably less than 20 degree angle. In this case, it can be considered that the measurement plane and the magnetization plane are parallel. In the invention, this difference in inclination will be negligible if it is less than 5 degree angle and, in this case, it can be considered that the measurement plane and the magnetization plane are strictly parallel.

Within the framework of the invention, it is provided to determine a value representative of the relative angular position between the two parts 14, 16 over an angular stroke about an axis of rotation (A). This angular position can be represented by the angle θ between the radial base vector $\vec{Xo}$ linked to the first part 14, for example chosen arbitrarily as being the one passing through the measurement point of the measurement cell or of the first measurement cell, according to the number of cells, and the base vector $\vec{X}$ linked to the second part.

Figure 8:
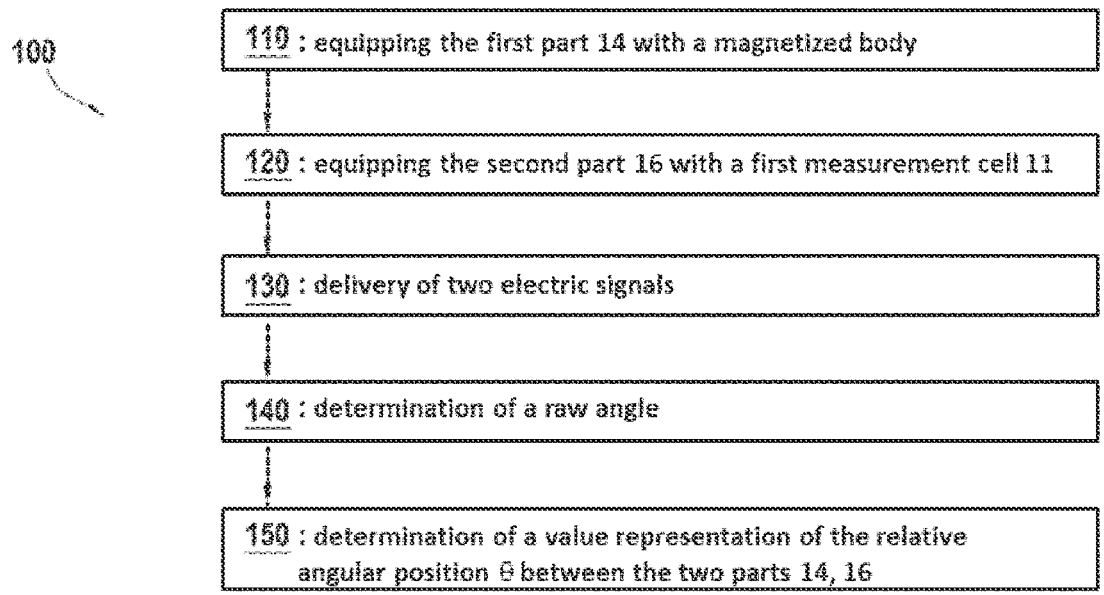
FIG. 8 illustrates steps of a method according to the invention.

As illustrated in FIG. 8, it is thus understood that a method 100 according to the invention comprises a step 110 of equipping the first part 14 with a magnetized body 10, as described above.

A differential method implementing two cells is more particularly described here.

The method comprises a step 120 of equipping the second part 16 with a first measurement cell 11 at a first measurement point C1 and with a second measurement cell 12 at a second measurement point C2, according to the modalities indicated above.

In the method, each measurement cell delivers 130 at least two electrical signals representative respectively of a primary component $By_1$, $By_2$ and a secondary component $Bz_1$, $Bz_2$ of the vector representative of the magnetic field B(1), B(2) created by the magnetized body 10 at the measurement point C1, C2 of the considered cell, respectively along a primary measurement axis AP1, AP2 and along a secondary measurement axis AS1, AS2, which form a measurement plane parallel to the axis of rotation A.

In the method, the first and second measurement cells 11, 12 can be arranged on the second part 16 such that the primary measurement axes AP1, AP2 of the first and second measurement cells are parallel to each other, preferably oriented vectorially in the same way, and that the secondary measurement axes AS1, AS2 of the first and second measurement cells are parallel to each other, preferably oriented vectorially in the same way. In other words, the measurement planes of the two cells are parallel. If this is not the case, a change of reference frame will be operated to express the components in the same reference.

The steps above of the method will be advantageously implemented by taking advantage of a sensor system 1 with two measurement cells as described above.

In step 150, the method determines a value representative of the relative angular position θ between the two parts by determining 140 a raw angle "gamma" whose tangent is a function of a differential composition of said components $By_1$, $By_2$, $Bz_1$, $Bz_2$ determined by the cells. This raw angle "gamma" is equal to or is representative of the orientation of the angle of the magnetic field vector created at the measurement point by the magnetized body. This raw angle is sometimes called "magnetic angle". The differential composition can in particular be an algebraic ratio between on the one hand a value representative of the difference of the first components $By_1$, $By_2$, possibly weighted, and on the other hand a value representative of the difference of the second components $Bz_1$, $Bz_2$, possibly weighted.

According to one embodiment of a differential method, a raw angle is calculated, whose tangent is a function of a ratio between on the one hand the difference of the secondary components and on the other hand the difference of the primary components, measured by the two cells 11, 12 for a given relative angular position.

This method thus includes one or several calculation step(s) which can be implemented in a calculation unit, the latter being integrated into the sensor system 1, or being remote, for example in an electronic control unit or a computer. The calculation unit typically includes one or several memory module(s), at least a processor, a data input/output module and possibly a communication module. The calculation steps of the method are typically implemented by a computer program containing the corresponding instructions and stored in the memory module.

Thus, in this example, it is provided to calculate a value $\Delta B_y$ representative of the difference between the first primary component $By_1$ and the second primary component $By_2$, measured respectively at the points C1 and C2. Typically, this difference value can be written in the form of a function, for example a linear or affine function:

$$\Delta B_y = f_y(By_1 - By_2)$$

For example, it might be possible to have:

$$\Delta B_y = a_y^*(By_1 - By_2) + c_y$$

In the simplest manner, it is possible to have:

$$\Delta B_y = By_1 - By_2 \quad (1)$$

Likewise, it is provided to calculate a value $\Delta B_z$ representative of the difference between the first secondary component $Bz_1$ and the second secondary component $Bz_2$, measured respectively at the points C1 and C2. Typically, this difference value can be written in the form of a function, for example a linear or affine function:

$$\Delta B_z = f_z(Bz_1 - Bz_2)$$

For example, it might be possible to have:

$$\Delta B_z = a_z^*(Bz_1 - Bz_2) + c_y$$

In the simplest manner, it is possible to have:

$$\Delta B_z = Bz_1 - Bz_2 \quad (2)$$

In this case, the invention provides for determining a raw angle gamma as being the arc whose tangent is representative of a ratio between on the one hand the difference of the secondary components and on the other hand the difference of the primary components, this ratio can be the ratio $\Delta B_z/\Delta B_z$ or the inverse ratio $\Delta B_y/\Delta B_z$. Depending on the chosen ratio, the raw angle gamma or its complementary angle (90°-gamma) will be obtained, from which it will be easy to return to the desired raw angle.

Thus, this value of raw angle gamma can be written in the form of a function:

$$\text{gamma} = \text{Arctan}\{f[\Delta B_z/\Delta B_y]\} \text{ or gamma} = \text{Arctan}\{f[\Delta B_y/\Delta B_z]\}$$

namely, for example:

$$\text{gamma} = \text{Arctan}\{f[f_z(Bz_1 - Bz_2)/f_y(By_1 - By_2)]\}$$

In this equation, the function f can be considered as a filtering function of the measured values. In the simplest manner, it is possible to have:

$$\text{gamma} = \text{Arctan}\{K_{yz} \times [(Bz_1 - Bz_2)/(By_1 - By_2)]\} \quad (3)$$

where $K_{xy}$ is a value equal to 1 for the theoretical calculation of the value of the angle of the magnetic field in the measurement plane of the cell, but it is sometimes advantageous to use another value in order to compensate for measurement biases.

In one embodiment with a single cell, the raw angle can be obtained very easily, for example in the form:

$$\text{gamma} = \text{Arctan}\{K_{yz} \times [(Bz_1 - Bz_2)/(By_1 - By_2)]\}$$

The raw angle corresponds to an orientation of the magnetic field at the measurement point, or is representative thereof. Due to the fact that the magnetization of the magnetized body is variable as explained above, the magnetic field created by the magnetized body, outside the magnetized body, also has a variable orientation. By ensuring that the orientation of the magnetic field vector at the measurement point varies over less than 360 degree angle over the relative angular stroke of the two parts 14, 16, it is possible to determine a relationship, if possible one-to-one relationship, between the raw angle and the relative angular position between the two parts. This relationship can be determined for example by calculation, by simulation, or by learning.

In order to illustrate the operation of the sensor presented in FIG. 5, the signals that can be obtained with such a sensor are shown in FIGS. 12A, 12B and 13A and 13B. These results are obtained by simulation.

Figure 12A:
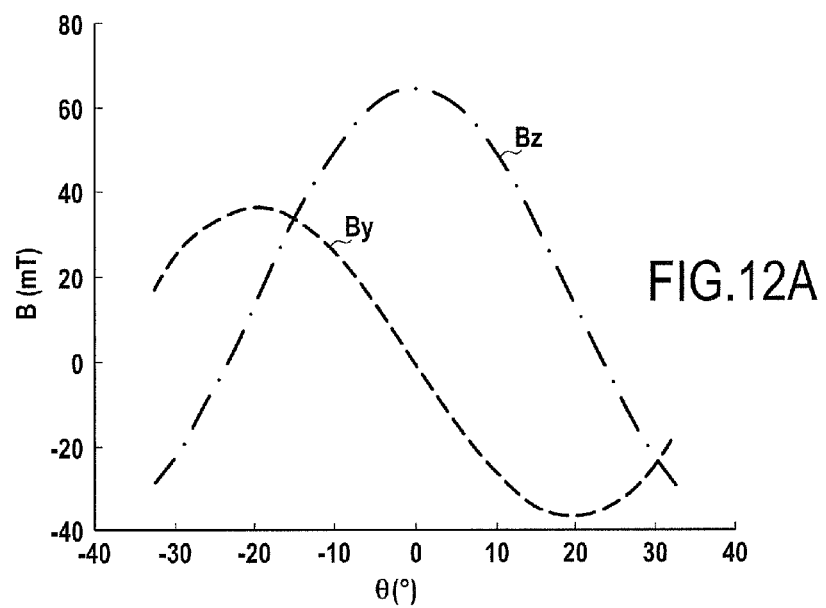
FIGS. 12A and 12B illustrate results obtained by simulation showing, for a configuration with one measurement cell, respectively on the one hand the components By and BZ of the magnetic field, and on the other hand a raw angle, or magnetic angle, which can be deduced from these components, as a function of the angular position of the two parts.
Figure 12B:
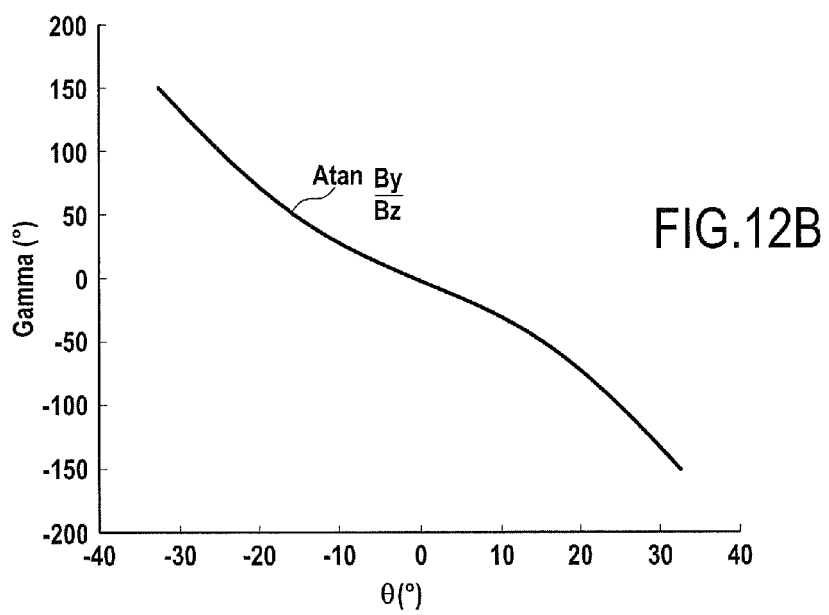

These figures show, respectively for a configuration with one measurement cell, and for a configuration with two measurement cells, the simple and differential field signals over a stroke of 65 degrees for an angular position sensor having the following parameters:

Internal radius of the body: 15.5 mm
Magnetized external radius: 21.5 mm
Measurement radius: 18.5 mm
magnetized angular extent: 78°
Thickness of the magnet: 4 mm
Measurement air gap: 1.7 mm FIG. 12A represents the signals By and Bz measured by a measurement cell at a point in the middle of the rotational stroke. FIG. 12B represents the angle obtained by calculating the arc tangent of the ratio By/Bz from the signals in FIG. 12A.

FIG. 13A represents the differential signals $By_2 - By_1$ and $Bz_2 - Bz_1$ obtained from the components of the magnetic field at the points C1 and C2 each spaced respectively by 0.95 mm on either side of the middle of the rotational stroke in the tangential direction, that is to say in the position of FIGS. 2A and 2B. FIG. 13B represents the angle obtained by calculating the arc tangent of the ratio $(Bz_2 - Bz_1)/(By_2 - By_1)$ of the differential signals from the signals in FIG. 13A.

The based measurement implementing a single cell has the advantage of simplicity and often requires less effort to have a sufficient measured field (magnetic field).

The method based on two cells operated in differential mode has the advantage of being robust with respect to the outer magnetic fields, however it may be more difficult to reach the sufficient measured signal (the difference in the magnetic field).

The present invention allows obtaining a variable magnetic field over the stroke of the sensor, which increases the accuracy of the sensor and often gives the possibility to use the differential method.

The invention is not limited to the described and represented examples because various modifications can be made without departing from its framework.

The invention claimed is:

1. A method for determining a relative angular position of a first part with respect to a second part over an angular stroke about an axis of rotation, in which:
the first part is equipped with a magnetized body, in the shape of an angular curved sector about the axis of rotation, said angular sector including a single angular portion or several successive angular portions about the axis of rotation, the magnetized body having, at any point of at least one angular portion of the magnetized body, a magnetization whose magnetization vector:
is parallel to a fixed magnetization plane for said angular portion of the magnetized body, and
has a continuously variable direction in the magnetization plane as a function of the position of the point of the magnetized body along a direction perpendicular to the axis of rotation in the magnetization plane;
the second part is equipped with at least a first measurement cell at a first measurement point, delivering two electrical signals representative respectively of a primary component and a secondary component of the magnetic field created by the magnetized body at the first measurement point of the first measurement cell, in a measurement plane,
the method determines a value representative of the relative angular position between the two parts as a function of said components measured by the first measurement cell for a given relative angular position;
wherein the magnetization plane of the magnetized body is parallel to the axis of rotation.

2. The method according to claim 1, wherein the magnetized body includes a single angular portion, the magnetized body having, at any point of the magnetized body, a magnetization whose magnetization vector:
is parallel to a single fixed magnetization plane for the magnetized body, and has a continuously variable direction in the magnetization plane as a function of the position of the point of the magnetized body along a direction perpendicular to the axis of rotation in the magnetization plane.

3. The method according to claim 2, wherein the magnetization plane is perpendicular to a radius derived from the axis of rotation and comprised in the angular extent of the magnetized body about the main axis, oriented along a bisector of the angular extent of the magnetized body or of the angular stroke.

4. The method according to claim 1, wherein the magnetized body includes at least a first angular portion and at least a second angular portion distinct from each other about the axis of rotation, the magnetized body having a magnetization whose magnetization vector:
at any point of the first angular portion of the magnetized body, is parallel to a first fixed magnetization plane,
at any point of the second angular portion of the magnetized body, is parallel to a second fixed magnetization plane, and
has a continuously variable direction in the magnetization plane as a function of the position of the point of the angular portion of the magnetized body along a direction perpendicular to the axis of rotation in the magnetization plane.

5. The method according to claim 4, wherein, for each angular portion, the magnetization plane is perpendicular to a radius derived from the axis of rotation and comprised in the angular extent of the angular portion.

6. The method according to claim 1, wherein the second part is equipped with a second measurement cell at a second measurement point, delivering two electrical signals representative respectively of a primary component and a secondary component of the magnetic field created by the magnetized body at the second measurement point of the second measurement cell, in the measurement plane, and in that the method determines a value representative of the relative angular position between the two parts by determining a raw angle whose tangent is a function of a differential composition of said components measured by the two cells for a given relative angular position.

7. The method according to claim 6, wherein the first and second measurement cells are arranged on the second part such that the primary measurement axes of the first and second measurement cells are parallel to each other, and that the secondary measurement axes of the first and second measurement cells are parallel to each other.

8. The method according to claim 6, wherein the method determines a value representative of the relative angular position between the two parts by determining a raw angle whose tangent is a function of a ratio between on the one hand the difference of the secondary components and on the other hand the difference of the primary components, measured by the two cells for a given relative angular position.

9. The method according to claim 1, wherein a first measurement point of the first measurement cell and the second measurement point of the second cell are arranged at a distance from the axis of rotation which is smaller than the radius of an outer cylindrical surface of the magnetized body, while being offset from the magnetized body along the direction of the axis of rotation.

10. The method according to claim 1, wherein the magnetized body has the shape of a segment of a tubular sector which is cylindrical of revolution about the main axis.

11. The method according to claim 1, wherein the magnetized body has the shape of a segment of an angular sector of a disc which is cylindrical of revolution about the main axis of rotation.

12. The method according to claim 1, wherein the measurement plane of the first measurement cell is parallel to the axis of rotation.

13. A sensor system for determining a relative angular position of a first part with respect to a second part over an angular stroke about an axis of rotation, the system comprising:
a magnetized body in the shape of an angular curved sector about a main axis parallel to the axis of rotation, said angular sector including a single angular portion or several successive angular portions about the main axis, and the magnetized body having a magnetization with, at any point of at least one angular portion of the magnetized body, a magnetization whose magnetization vector:
is parallel to a fixed magnetization plane for said angular portion of the magnetized body, and
has a continuously variable direction in the magnetization plane as a function of the position of the point of the magnetized body along a direction perpendicular to the axis of rotation in the magnetization plane;

a first measurement cell at a first measurement point, delivering two electrical signals representative respectively of a primary component (BM and a secondary component of the magnetic field created by the magnetized body at the measurement point of the first measurement cell in a measurement plane, a second measurement cell at a second measurement point, delivering two electrical signals representative respectively of a primary component and a secondary component of the magnetic field created by the magnetized body at the measurement point of the second measurement cell, in the measurement plane;

wherein the magnetization plane of the magnetized body is parallel to the axis of rotation.

14. The sensor system according to claim 13, wherein the magnetized body includes a single angular portion, the magnetized body having, at any point of the magnetized body, a magnetization whose magnetization vector:

is parallel to a single fixed magnetization plane for the magnetized body, and has a continuously variable direction in the magnetization plane as a function of the position of the point of the magnetized body along a direction perpendicular to the main axis in the magnetization plane.

15. The sensor system according to claim 14, wherein the magnetization plane is perpendicular to a radius derived from the main axis and comprised in the angular extent of the magnetized body about the main axis, oriented along a bisector of the angular extent of the magnetized body or of the angular stroke.

16. The sensor system according to claim 13, wherein the magnetized body includes at least a first angular portion and at least a second angular portion distinct from each other about the main axis, the magnetized body having a magnetization whose magnetization vector:

is parallel to a first fixed magnetization plane, at any point of the first angular portion of the magnetized body, is parallel to a second fixed magnetization plane, at any point of the second angular portion of the magnetized body, and has a continuously variable direction in the magnetization plane as a function of the position of the point of the angular portion of the magnetized body along a direction perpendicular to the main axis in the magnetization plane.

17. The sensor system according to claim 16, wherein, for each angular portion, the magnetization plane is perpendicular to a radius derived from the main axis and comprised in the angular extent of the angular portion.

18. The sensor system according to claim 13, wherein the system includes the second measurement cell at a second measurement point, delivering two electrical signals representative respectively of a primary component and a secondary component of the magnetic field created by the magnetized body at the measurement point of the first measurement cell, in the measurement plane, and in that the sensor system determines a value representative of the relative angular position between the two parts by determining a raw angle whose tangent is a function of a differential composition of said components measured by the two cells for a given relative angular position.

19. The sensor system according to claim 18, wherein the first and second measurement cells are arranged such that the primary measurement axes of the first and second measurement cells are parallel to each other, and that the secondary measurement axes of the first and second measurement cells are parallel to each other.

20. The sensor system according to claim 18, wherein the system includes a calculation unit programmed to determine a value representative of the relative angular position between the two parts by determining a raw angle whose tangent is a function of a ratio between on the one hand the difference of the secondary components and on the other hand the difference of the primary components, measured by the two cells for a given relative angular position.

21. The sensor system according to claim 13, wherein the first measurement point of the first measurement cell and the second measurement point of the second cell are arranged at a distance from the axis of rotation which is smaller than the radius of an outer cylindrical envelope surface of the magnetized body, while being offset from the magnetized body along the direction of the axis of rotation.

22. The sensor system according to claim 13, wherein the magnetized body has the shape of a segment of a tubular sector which is cylindrical of revolution about the axis of rotation.

23. The sensor system according to claim 13, wherein the magnetized body has the shape of a segment of an angular sector of a disc which is cylindrical of revolution about the axis of rotation.

24. The sensor system according to claim 13, wherein the magnetized body has the shape of an angular sector which is cylindrical of revolution about the main axis.

25. The sensor system according to claim 13, wherein the main axis coincides with the axis of rotation.

26. The sensor system according to claim 13, wherein the measurement planes of the first and second measurement cells are parallel to the axis of rotation.

27. A method for manufacturing a magnetized body for a system for determining a relative angular position of a first part with respect to a second part about an axis of rotation, the method comprising:

providing a body of magnetizable material having the shape of an angular curved sector and having an angular extent about a main axis, said angular sector including a single angular portion or several successive angular portions about the main axis;

wherein the method includes, for at least a first angular portion of the magnetized body:

the disposition, in the vicinity of the first angular portion of the body of magnetizable material, of a first network of parallel electrical conductors comprising several bundles of parallel electrical conductors, having an orientation perpendicular to the main axis and parallel to a first directrix radius derived from the main axis and comprised in the angular extent of the first angular portion of the magnetized body, the bundles being offset laterally from each other along an offset direction perpendicular to their orientation and perpendicular to the main axis;

the flow of an electric current in the bundles of electrical conductors, the direction of flow of the current, defined in a fixed reference frame with respect to the magnetized body, being identical in all the conductors of the same bundle, and being reversed in two adjacent bundles, thus forming one or several outgoing bundle(s) in which the current flows along a first direction, and one or several incoming bundle(s) in which the current flows along a second direction, opposite to the first direction, the current flowing in the bundles being able to generate, around the network and in the body of magnetizable material, a magnetization magnetic field suitable for magnetizing the body of magnetizable material.

28. The manufacturing method according to claim 27, wherein the first network of parallel electrical conductors extends facing the first portion of the body of magnetizable material which is a single portion covering the angular extent of the body of magnetizable material.

29. The manufacturing method according to claim 27, wherein the first directrix radius is oriented along a bisector of the angular extent of the body of magnetizable material.

30. The manufacturing method according to claim 27, wherein the first network of parallel electrical conductors extends facing a first portion of the body of magnetizable material, in that a second network of parallel electrical conductors extends facing a second portion of the body of magnetizable material, distinct from the first portion, the bundles of parallel electrical conductors of the second network being oriented along a second orientation perpendicular to the main axis and parallel to a second directrix radius derived from the main axis and comprised in the angular extent of the second angular portion.

31. The manufacturing method according to claim 27, wherein the electrical conductors of the bundles are formed by segments of at least one winding of a conductive wire along which at least a conductor of an outgoing bundle, a connecting segment, and a conductor of an incoming bundle, another connecting segment and another conductor of an outgoing bundle, follow each other repeatedly.

\* \* \* \* \*